(12) United States Patent
Buser et al.

(10) Patent No.: US 6,507,921 B1
(45) Date of Patent: Jan. 14, 2003

(54) TRACE FIFO MANAGEMENT

(75) Inventors: Mark Buser, Pittsburgh, PA (US); Gilbert Laurenti, Saint Paul de Vence (FR); Ganesh M. Nandyal, Santa Clara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/411,708

(22) Filed: Oct. 1, 1999

(30) Foreign Application Priority Data

| Oct. 6, 1998 | (EP) | ............................................ 98402455 |
| Mar. 8, 1999 | (EP) | ............................................ 99400559 |

(51) Int. Cl.⁷ .............................................. G06F 11/00
(52) U.S. Cl. ...................................................... 714/45
(58) Field of Search ........................... 714/45, 47, 732; 712/227; 717/124, 128; 702/182, 183, 197

(56) References Cited

U.S. PATENT DOCUMENTS

| 5,473,754 A | * | 12/1995 | Folwell et al. ......... 395/183.21 |
| 5,491,793 A | * | 2/1996 | Somasundaram et al. .................... 395/183.21 |
| 5,574,937 A | * | 11/1996 | Narain ........................ 395/800 |
| 5,659,679 A | * | 8/1997 | Alpert et al. ............ 395/183.1 |
| 5,715,440 A | * | 2/1998 | Ohmura et al. ............. 395/580 |
| 5,737,516 A | | 4/1998 | Circello et al. ........ 395/183.14 |
| 5,802,272 A | * | 9/1998 | Sites et al. ............. 395/183.21 |
| 5,938,778 A | * | 8/1999 | John, Jr. et al. ............... 714/45 |
| 6,177,950 B1 | * | 1/2001 | Robb .......................... 348/14 |

* cited by examiner

Primary Examiner—Robert Beausoleil
Assistant Examiner—Marc Duncan
(74) Attorney, Agent, or Firm—Gerald E. Laws; W. James Brady, III; Frederick J. Telecky, Jr.

(57) ABSTRACT

A processor (100) is provided that is a programmable digital signal processor (DSP) with variable instruction length. A trace FIFO (800) is provided for tracing a sequence of instruction addresses to assist with software or hardware debugging. In order to conserve space, only the addresses of an instruction just before (M+K, P+Q) and just after (P, R) a discontinuity are stored in the trace FIFO. A sequence of instruction lengths ($SEC_{13}LPC$) is also stored in the trace FIFO so that the sequence of instruction addresses can be reconstructed by interpolating between two discontinuity points (P to P+Q).

16 Claims, 14 Drawing Sheets

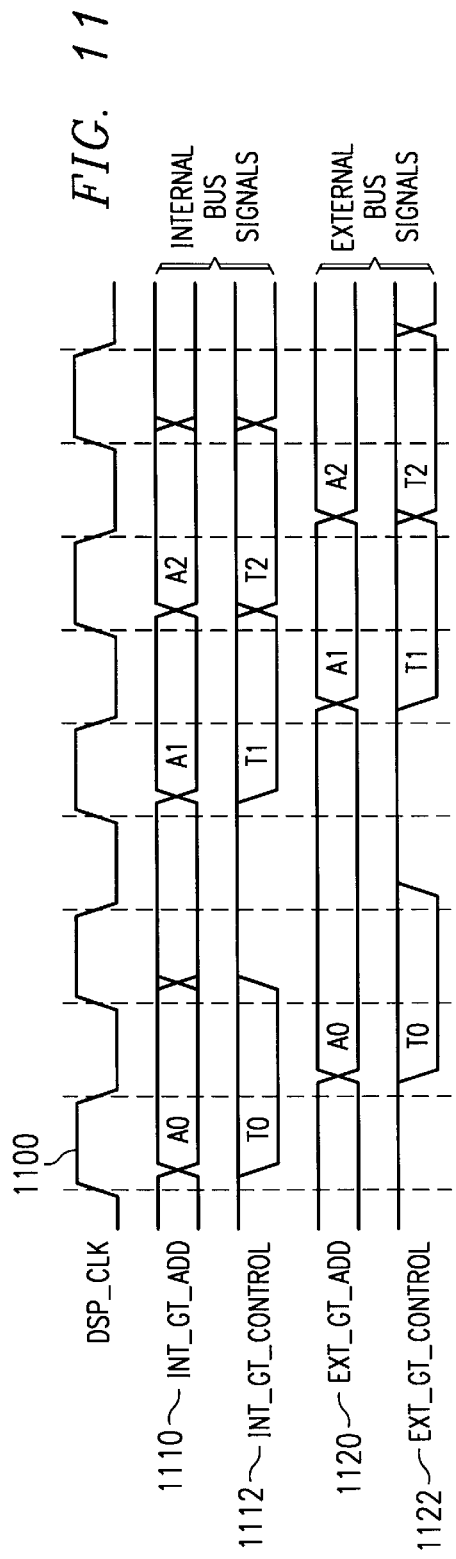
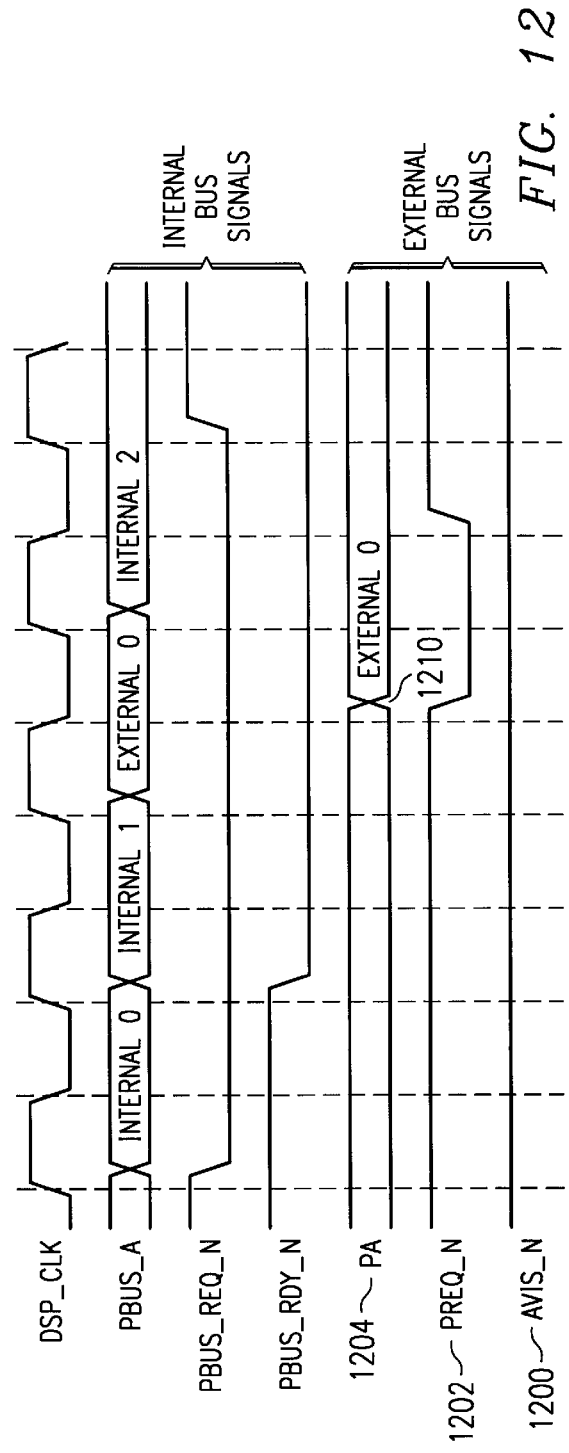

| TRC_DEVT | | | | | | | |
|---|---|---|---|---|---|---|---|
| EXE COND | PCINT | PCINTR | TRC RPT | TRC RPT | PCDIST | X | X |

| TRC_LEVT | | | | | | | |
|---|---|---|---|---|---|---|---|
| X | X | X | F2 | F1 | F0 | EXE COND | RPTS |

TRACE FIFO MANAGEMENT

This application claims priority to S.N. 99400559.3, filed in Europe on Mar. 8, 1999 (TI-27759EU) and S.N. 98402455.4, filed in Europe on Oct. 6, 1998 (TI-28433EU).

FIELD OF THE INVENTION

The present invention relates to digital microprocessors, and more particularly to monitoring the operation of digital microprocessors.

BACKGROUND OF THE INVENTION

Microprocessors are general purpose processors which require high instruction throughputs in order to execute software running thereon, and can have a wide range of processing requirements depending on the particular software applications involved. A software developer may want to trace the execution sequence of a program in order to determine actual execution sequence and then modify the program in order to optimize execution performance. Similarly, a software developer may want to trace the execution sequence of a program in order to identify an error. However, tracing a processor with limited external buses or on board caches is difficult or impossible.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in, but not exclusively, applications such as mobile telecommunications applications, it is desirable to provide ever increasing DSP performance while keeping power consumption as low as possible.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of processors, such as for example, but not exclusively, digital signal processors.

In accordance with a first aspect of the invention, there is provided a microprocessor that is a programmable digital signal processor (DSP), offering both high code density and easy programming. Architecture and instruction set are optimized for low power consumption and high efficiency execution of DSP algorithms, such as for wireless telephones, as well as pure control tasks. The microprocessor has an instruction buffer unit operable to decode a first instruction of the sequence of instructions and a means for providing an instruction address that identifies the first instruction in the sequence of instructions to be decoded by the instruction buffer unit. Furthermore, the microprocessor has a means for tracing the instruction address of the first instruction that is operable to store the address of the first instruction only if the first instruction is adjacent to a discontinuity in the sequence of instructions.

In accordance with another aspect of the present invention, the means for tracing is further operable to store a first length format data item indicative of a length of the first instruction.

In accordance with another aspect of the present invention, the means for tracing is further operable to store a first repeat instruction format data item if the first instruction is a repeat instruction, such that an address of the first instruction is stored only once by the means for tracing if the first instruction is a repeat instruction.

In accordance with another aspect of the present invention, a method of operating a digital system is provided. A microprocessor is operable to trace a sequence of instruction addresses by providing an instruction address that identifies a first instruction in a sequence of instructions to be decoded by an instruction buffer unit, decoding the first instruction of the sequence of instructions in the instruction buffer unit, and then tracing the instruction address of the first instruction by storing the address of the first instruction only if the first instruction is adjacent to a discontinuity in the sequence of instruction addresses. These steps are repeated to form a sequence of discontinuity addresses. The sequence of instruction addresses is reconstructed by interpolating between each discontinuity in the sequence of discontinuity addresses.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the processor of FIG. 1, unless otherwise stated, and in which:

FIG. 11 is a timing diagram illustrating timing for the trace signals which are output from the external memory interface of FIG. 9;

FIG. 12 is a timing diagram illustrating memory cycle timing with caching and tracing disabled;

DESCRIPTION OF PARTICULAR EMBODIMENTS

Although the invention finds particular application to Digital Signal Processors (DSPs), implemented, for example, in an Application Specific Integrated Circuit (ASIC), it also finds application to other forms of processors.

The basic architecture of an example of a processor according to the invention will now be described. Processor 100 is a programmable fixed point DSP core with variable instruction length (8 bits to 48 bits) offering both high code density and easy programming. Architecture and instruction set are optimized for low power consumption and high efficiency execution of DSP algorithms as well as pure control tasks, such as for wireless telephones, for example. Processor 100 includes emulation and code debugging facilities.

Figure 1:
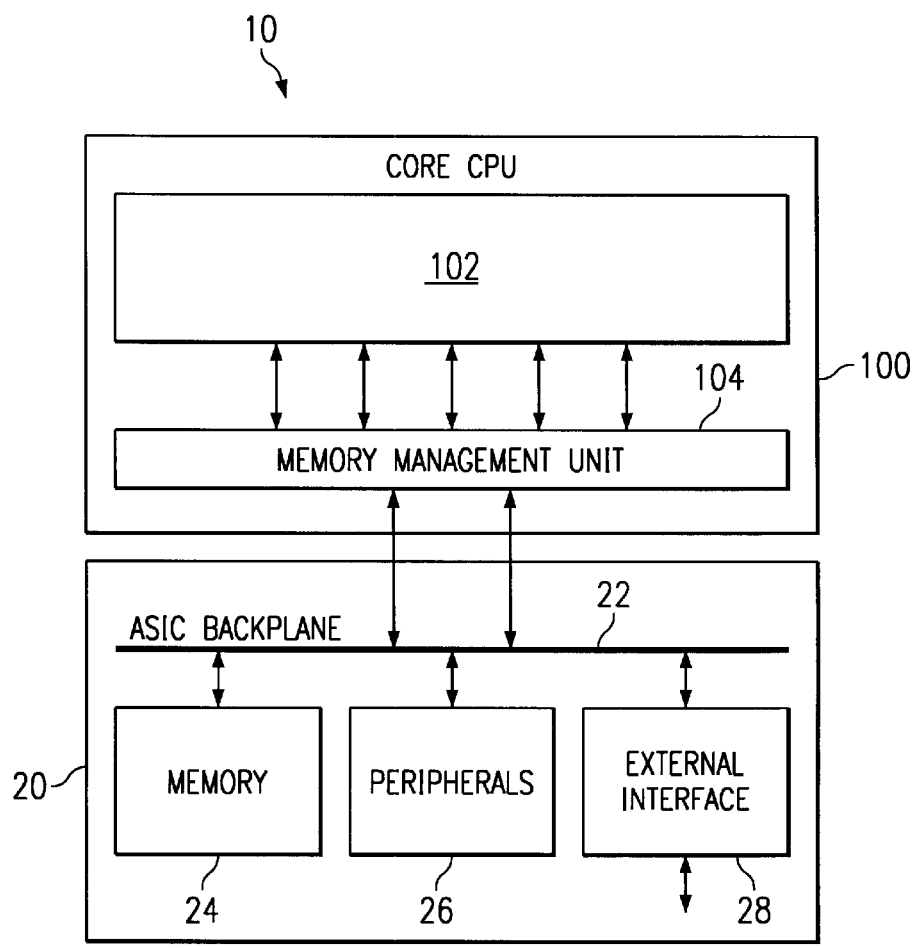
FIG. 1 is a schematic block diagram of a digital system which includes a microprocessor in accordance with an embodiment of the invention.

FIG. 1 is a schematic overview of a digital system 10 in accordance with an embodiment of the present invention. The digital system includes a processor 100 and a processor backplane 20. In a particular example of the invention, the digital system is a Digital Signal Processor System 10 implemented in an Application Specific Integrated Circuit (ASIC). In the interest of clarity, FIG. 1 only shows those portions of microprocessor 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 100 relevant to an embodiment of the present invention are explained in sufficient detail herein below, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977 (TI-28433), which is incorporated herein by reference.

As shown in FIG. 1, processor 100 forms a central processing unit (CPU) with a processor core 102 and a memory interface unit 104 for interfacing the processor core 102 with memory units external to the processor core 102.

Processor backplane 20 comprises a backplane bus 22, to which the memory management unit 104 of the processor is connected. Also connected to the backplane bus 22 is an instruction memory 24, peripheral devices 26 and an external interface 28.

It will be appreciated that in other examples, the invention could be implemented using different configurations and/or different technologies. For example, processor 100 could form a first integrated circuit, with the processor backplane 20 being separate therefrom. Processor 100 could, for example be a DSP separate from and mounted on a backplane 20 supporting a backplane bus 22, peripheral and external interfaces. The processor 100 could, for example, be a microprocessor rather than a DSP and could be implemented in technologies other than ASIC technology. The processor or a processor including the processor could be implemented in one or more integrated circuits.

Figure 2:
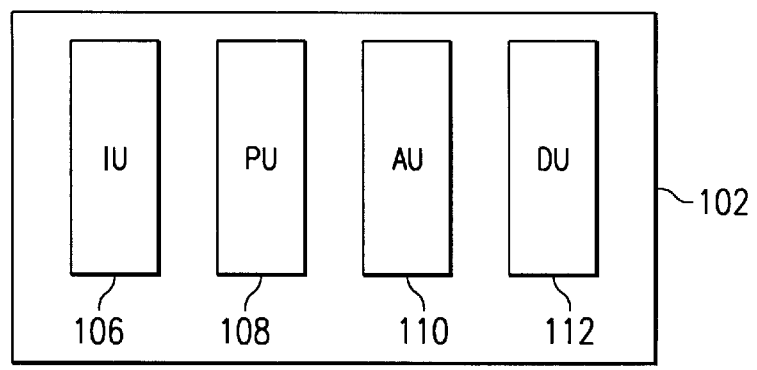
FIG. 2 is a schematic diagram of the processor core of FIG. 1.

FIG. 2 illustrates the basic structure of an embodiment of the processor core 102. As illustrated, this embodiment of the processor core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
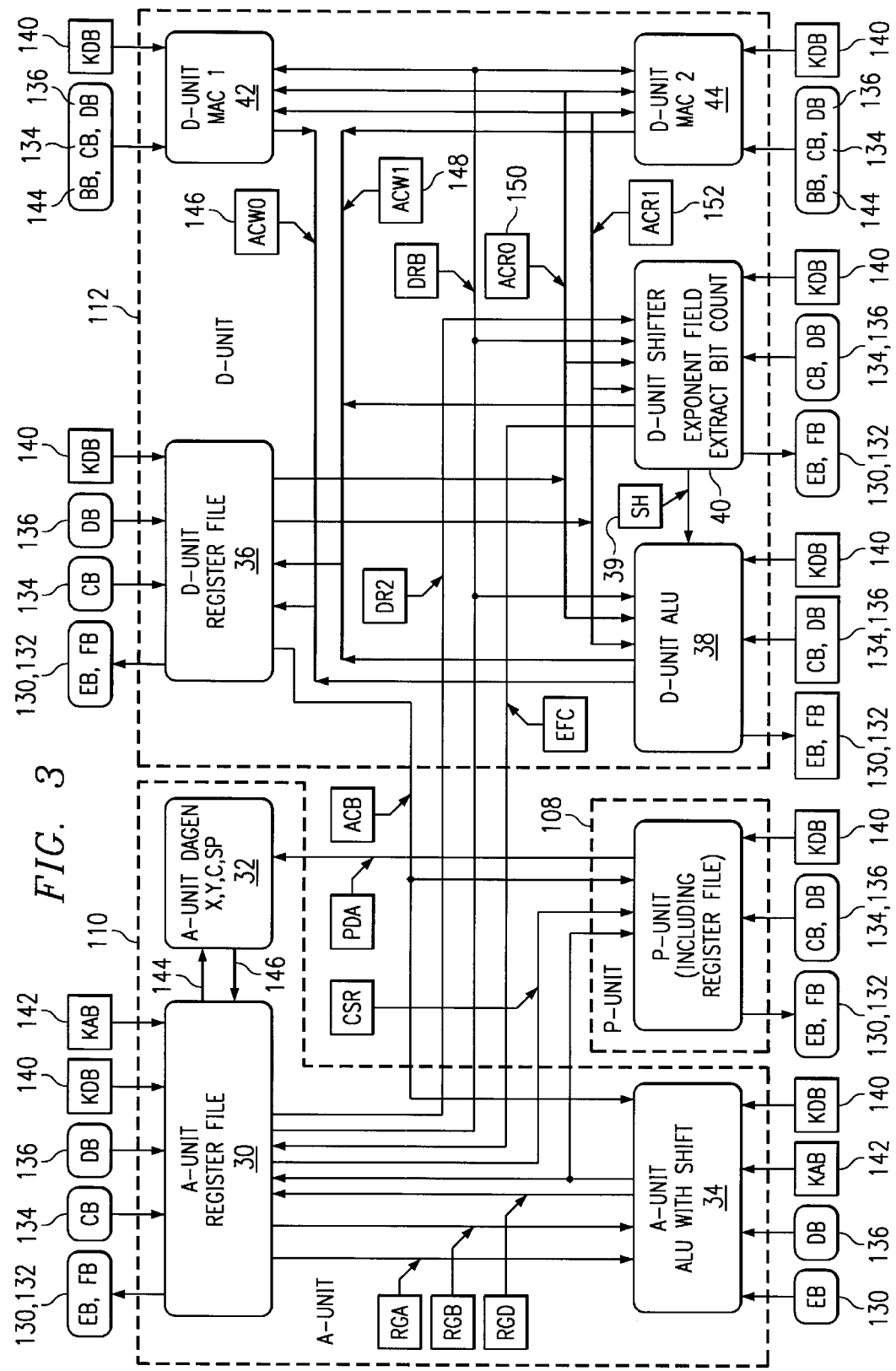
FIG. 3 is a more detailed schematic block diagram of various execution units of the processor core.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0-AR7) and data registers (DR0-DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose buses (EB,DB) 130,136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by buses RGA and RGB for receiving address and data register contents and by a bus RGD for forwarding address and data registers in the register file 30.

In accordance with the illustrated embodiment of the invention, D Unit 112 includes a D Unit register file 36, a D Unit ALU 38, a D Unit shifter 40 and two multiply and accumulate units (MAC 1, MAC 2) 42 and 44. The D Unit register file 36, D Unit ALU 38 and D Unit shifter 40 are coupled to buses (EB, FB, CB, DB and KDB) 130, 132, 134, 136 and 140, and the MAC units 42 and 44 are coupled to the buses (CB, DB, KDB) 134, 136, 140 and Data Read bus (BB) 144. The D Unit register file 36 includes 40-bit accumulators (AC0-AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write buses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read buses (ACR0, ACR1) 150, 152. The D Unit ALU 38 and D Unit shifter 40 are also coupled to sub-units of the A Unit 108 via various buses labeled EFC, DRB, DR2 and ACB.

Figure 4:
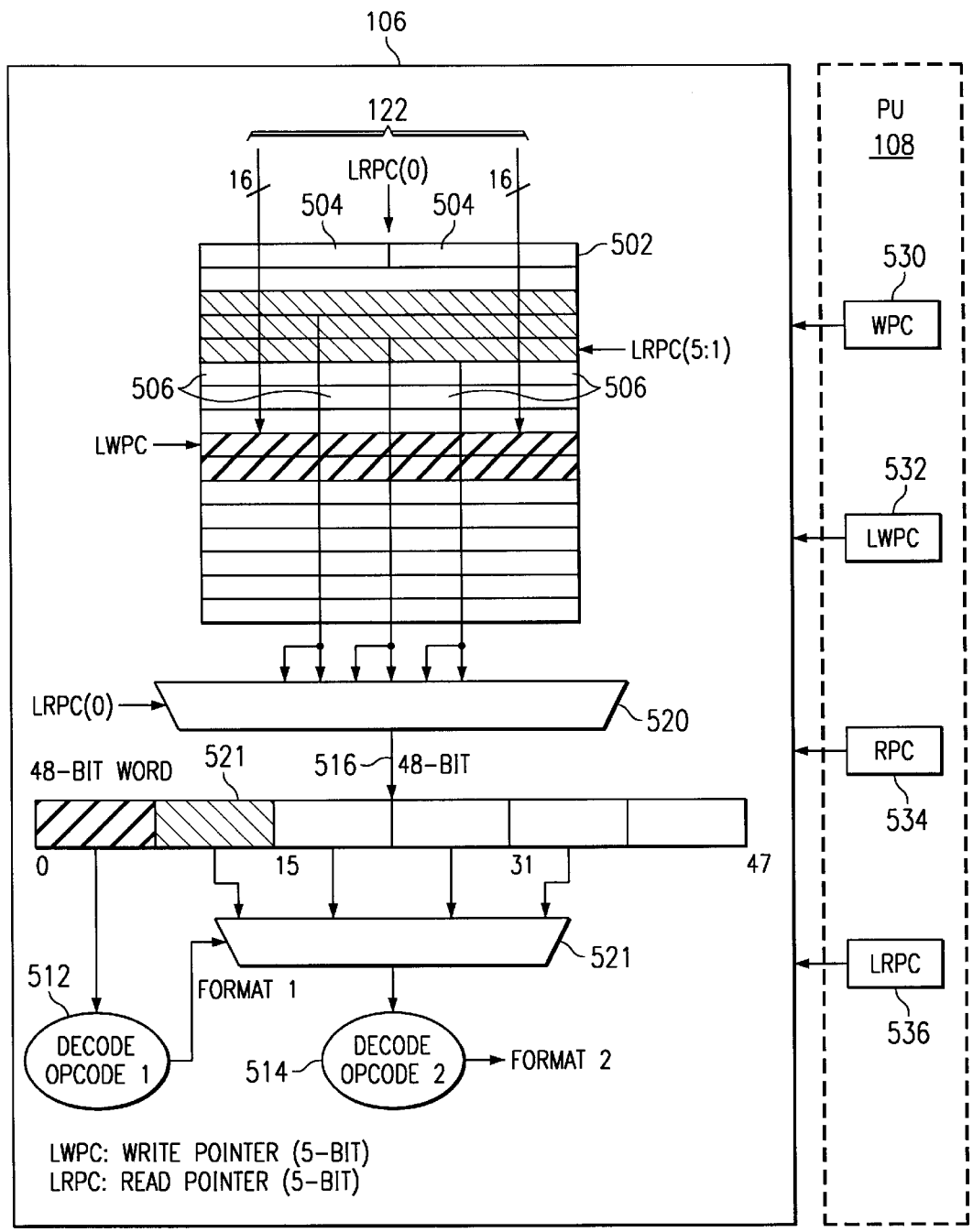
FIG. 4 is a schematic diagram of an instruction buffer queue and an instruction decoder of the processor.

Referring now to FIG. 4, there is illustrated an instruction buffer unit 106 in accordance with the present embodiment, comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder/s 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder/s 512/514.

In this embodiment, the instructions are formed into a 48 bit word and are loaded into the instruction decoders 512, 514 over a 48 bit bus 516 via multiplexers 520 and 521. It will be apparent to a person of ordinary skill in the art that the instructions may be formed into words comprising other than 48-bits, and that the present invention is not to be limited to the specific embodiment described above.

For presently preferred 48-bit word size, bus 516 can load a maximum of 2 instructions, one per decoder, during any one instruction cycle for parallel execution. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decode thereof. The multiplexing associated with the alignment of instructions with byte boundaries is performed in multiplexors 520 and 521.

Two instructions can be put in parallel if one of the two instructions is provided with a parallel enable bit. The hardware support for such type of parallelism is called the parallel enable mechanism. Likewise, two instructions can be put in parallel if both of the instructions make single data memory accesses (Smem, or dbl(lmem)) in indirect mode. The hardware support for such type of parallelism is called the soft dual mechanism.

Figure 5:
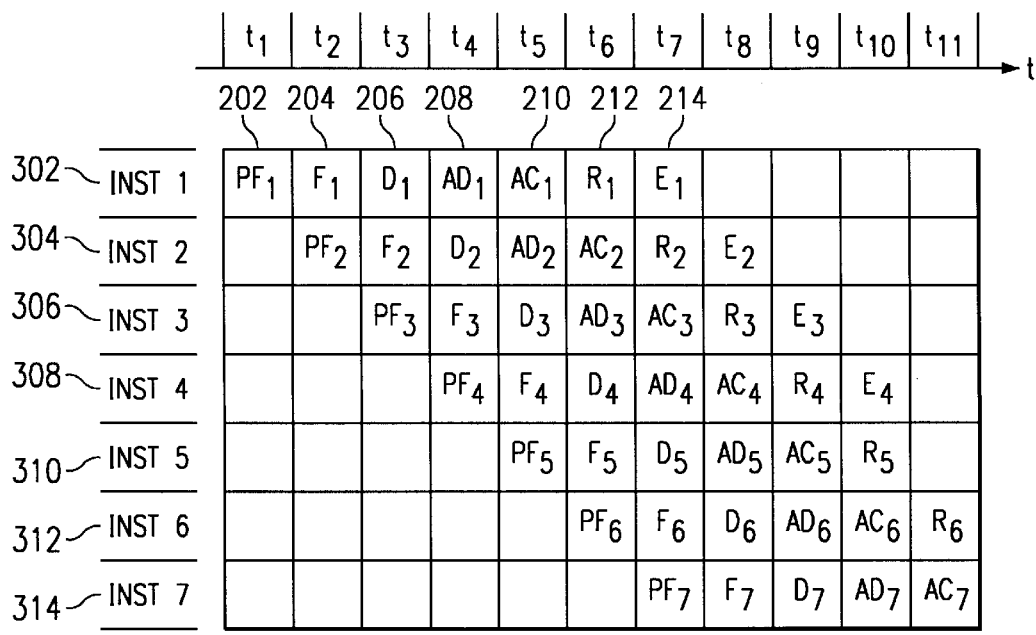
FIG. 5 is a schematic representation of the processor core for explaining the operation of the pipeline of the processor.

Processor core 102 executes instructions through a 7 stage pipeline, the respective stages of which will now be described with reference to Table 1 and to FIG. 5. The processor instructions are executed through a seven stage pipeline regardless of where the execution takes place (A unit or D unit). In order to reduce program code size, a C compiler, according to one aspect of the present invention, dispatches as many instructions as possible for execution in the A unit, so that the D unit can be switched off to conserve power. This requires the A unit to support basic operations performed on memory operands.

TABLE 1

Processor Pipeline Operation for a Single Cycle Instruction With No Memory Wait States

| Pipeline stage | Description. |
| --- | --- |
| P0 Pre-Fetch | Address program memory via the program address bus PAB. |
| P1 Fetch | Read program memory through the program bus PB. Fill instruction buffer queue with the 4 bytes fetched in program memory. |
| P2 Decode | Read instruction buffer queue (6 bytes) Decode instruction pair or single instruction. Dispatch instructions on Program Flow Unit (PU), Address Data Flow Unit (AU), and Data Computation Unit (DU). |
| P3 Address | Data address computation performed in the 3 address generators located in AU:<br>- Pre-computation of address to be generated in:<br>  - direct SP/DP relative addressing mode.<br>  - indirect addressing mode via pointer registers.<br>- Post-computation on pointer registers in:<br>  - indirect addressing mode via pointer registers.<br>Program address computation for PC relative branching instructions: goto, call, switch. |
| P4 Access | Read memory operand address generation on BAB, CAB, DAB buses.<br>Read memory operand on CB bus (Ymem operand). |
| P5 Read | Read memory operand on DB (Smem, Xmem operand), on CB and DB buses (Lmem operand), on BB (coeff operand) Write memory operand address generation on EAB and FAB buses. |

TABLE 1-continued

Processor Pipeline Operation for a Single Cycle
Instruction With No Memory Wait States

| Pipeline stage | Description. |
|---|---|
| P6 Execute | Execute phase of data processing instructions executed in A unit and D unit.<br>Write on FB bus (Ymem operand).<br>Write Memory operand on EB (Smem, Xmem operand), on EB and FB buses<br>(Lmem operand). |

The first stage of the pipeline is a PRE-FETCH (P0) stage 202, during which stage a next program memory location is addressed by asserting an address on the address bus (PAB) 118 of a memory interface 104.

In the next stage, FETCH (P1) stage 204, the program memory is read and the I Unit 106 is filled via the PB bus 122 from the memory interface unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in A Unit 110 or P Unit 108 respectively.

In an ACCESS (P4) stage 210, the address of a read operand is generated and the memory operand, the address of which has been generated in a DAGEN Y operator with a Ymem indirect addressing mode, is then READ from indirectly addressed Y memory (Ymem).

The next stage of the pipeline is the READ (P5) stage 212 in which a memory operand, the address of which has been generated in a DAGEN X operator with an Xmem indirect addressing mode or in a DAGEN C operator with coefficient address mode, is READ. The address of the memory location to which the result of the instruction is to be written is generated.

Finally, there is an execution EXEC (P6) stage 214 in which the instruction is executed in either the A Unit 110 or the D Unit 112. The result is then stored in a data register or accumulator, or written to memory for Read/Modify/Write instructions. Additionally, shift operations are performed on data in accumulators during the EXEC stage.

Processor 100's pipeline is protected. This significantly improves the C compiler performance since no NOP's instructions have to be inserted to meet latency requirements. It also makes the code translation from a prior generation processor to a latter generation processor much easier.

A pipeline protection basic rule used in processor 100 is as follows: if a write access has been initiated before the on going read access but not yet completed and if both accesses share the same resource then extra cycles are inserted to allow the write completion and execute next instruction with the updated operands; but for emulation, a single step code execution must behave exactly as free running code execution.

The basic principle of operation for a pipeline processor will now be described with reference to FIG. 5. As can be seen from FIG. 5, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 5 for a seven stage pipeline a total of seven instructions may be processed simultaneously. For all seven instructions 302–314, FIG. 5 shows them all under process in time period $T_7$. Such a structure adds a form of parallelism to the processing of instructions.

Figure 6:
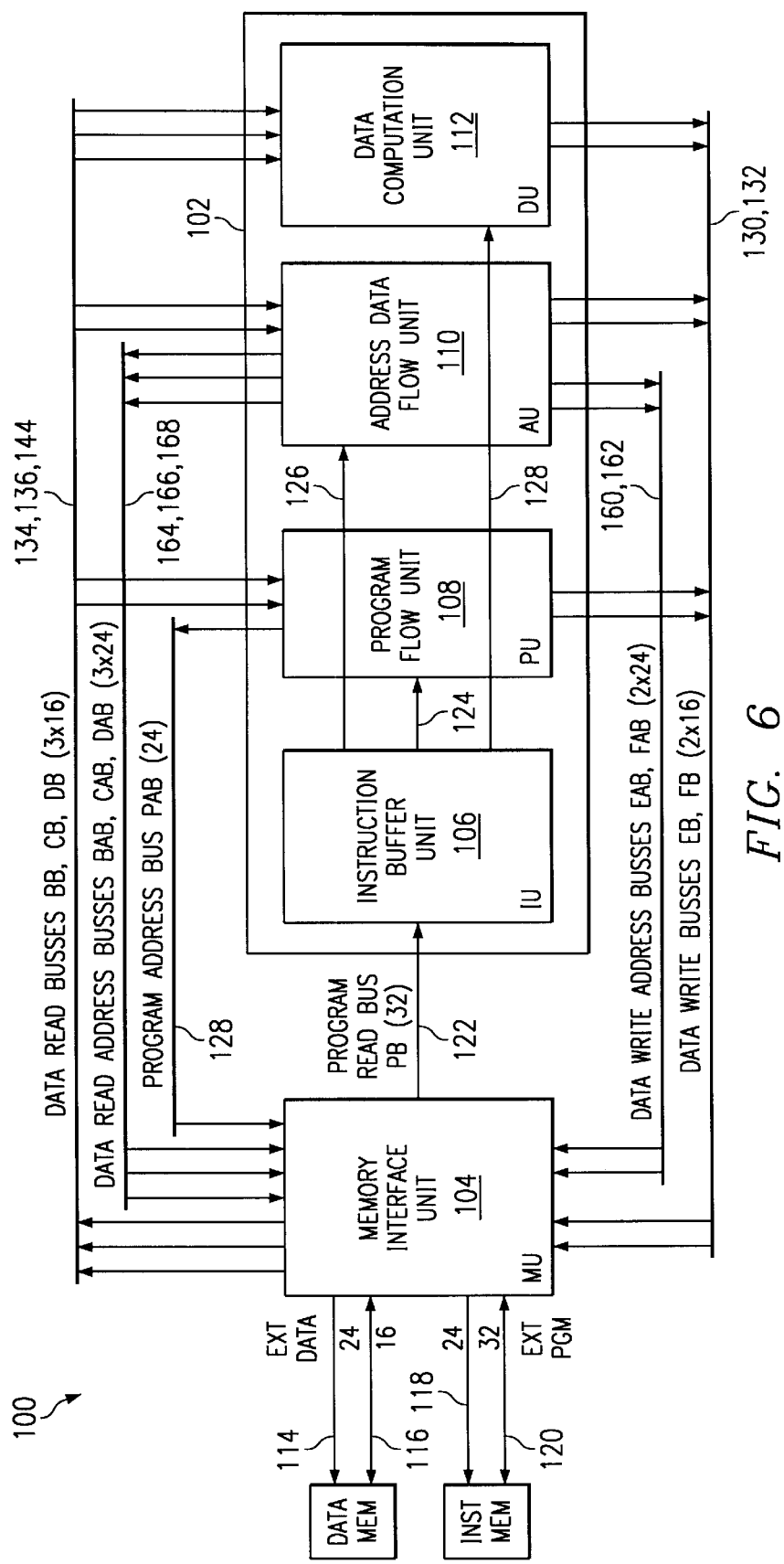
FIG. 6 is a block diagram of the processor illustrating a memory management unit interconnected memory.

As shown in FIG. 6, the present embodiment of the invention includes a memory interface unit 104 which is coupled to external program storage memory 150 via a 24 bit address bus 118 and a 32 bit bi-directional data bus 120. Additionally, the memory interface unit 104 is coupled to data memory units 151 via a 24 bit address bus 114 and a bi-directional 16 bit data bus 116. The memory interface unit 104 is also coupled to the I Unit 106 of the machine processor core 102 via a 32 bit program read bus (PB) 122. The P Unit 108, A Unit 110 and D Unit 112 are coupled to the memory interface unit 104 via data read and data write buses and corresponding address buses. The P Unit 108 is further coupled to a program address bus 128.

More particularly, the P Unit 108 is coupled to the memory interface unit 104 by a 24 bit program address bus 128, the two 16 bit data write buses (EB, FB) 130, 132, and the two 16 bit data read buses (CB, DB) 134, 136. The A Unit 110 is coupled to the memory interface unit 104 via two 24 bit data write address buses (EAB, FAB) 160, 162, the two 16 bit data write buses (EB, FB) 130, 132, the three data read address buses (BAB, CAB, DAB) 164, 166, 168 and the two 16 bit data read buses (CB, DB) 134, 136. The D Unit 112 is coupled to the memory interface unit 104 via the two data write buses (EB, FB) 130, 132 and three data read buses (BB, CB, DB) 144, 134, 136.

FIG. 6 represents the passing of instructions from the I Unit 106 to the P Unit 108 at 124, for forwarding branch instructions for example. Additionally, FIG. 6 represents the passing of data from the I Unit 106 to the A Unit 110 and the D Unit 112 at 126 and 128 respectively.

Figure 7:
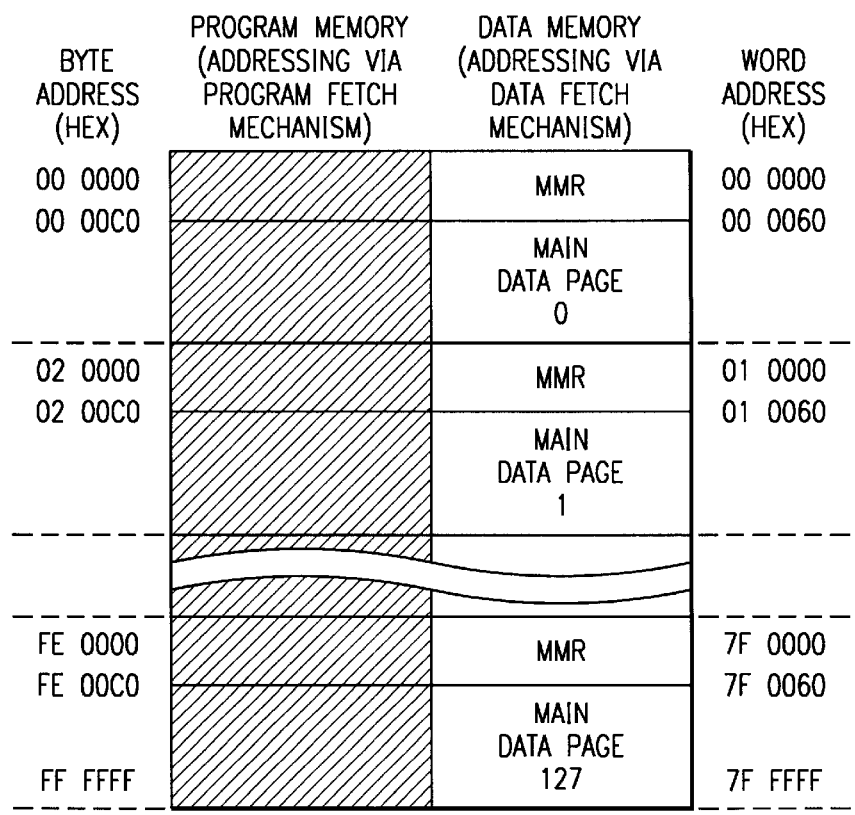
FIG. 7 shows the unified structure of Program and Data memory spaces of the processor.

Processor 100 is organized around a unified program/data space, as illustrated in FIG. 7. A program pointer is internally 24 bits and has byte addressing capability, but only a 22 bit address is exported to memory since program fetch is always performed on a 32 bit boundary. However, during emulation for software development, for example, the full 24 bit address is provided for hardware breakpoint implementation. Data pointers are 16 bit extended by a 7 bit main data page and have word addressing capability.

Software can define up to 3 main data pages, as follows:

| MDP | Direct access | Indirect access | CDP |
|---|---|---|---|
| MDP05 | — | Indirect access | AR[0–5] |
| MDP67 | — | Indirect access | AR[6–7] |

A stack is maintained and always resides on main data page 0. CPU memory mapped registers are visible from all the pages.

Various aspects of processor 100 are summarized in Table 2.

TABLE 2

Summary of Improved Processor 100
Very Low Power programmable processor
Parallel execution of instructions, 8-bit to 48-bit instruction format
Seven stage pipeline (including pre-fetch)

| | |
|---|---|
| Instruction buffer unit highlight | 32 × 16 buffer size<br>Parallel Instruction dispatching<br>Local Loop |
| Data computation unit highlight | Four 40 bit generic (accumulator) registers<br>Single cycle 17 × 17 Multiplication-Accumulation (MAC) 40 bit ALU, "32 + 8" or "(2 × 16) + 8"<br>Special processing hardware for Viterbi functions Barrel shifter |
| Program flow unit highlight | 32 bits/cycle program fetch bandwidth<br>24 bit program address<br>Hardware loop controllers (zero overhead loops) Interruptible repeat loop function<br>Bit field test for conditional jump<br>Reduced overhead for program flow control |
| Data flow unit highlight | Three address generators, with new addressing modes Three 7 bit main data page registers<br>Two Index registers<br>Eight 16 bit pointers<br>Dedicated 16 bit coefficients pointer<br>Four 16 bit generic registers<br>Three independent circular buffers<br>Pointers & registers swap<br>16 bits ALU with shift |
| Memory Interface highlight | Three 16 bit operands per cycle<br>32 bit program fetch per cycle<br>Easy interface with cache memories |
| C compiler | |
| Algebraic assembler | |

Figure 8:
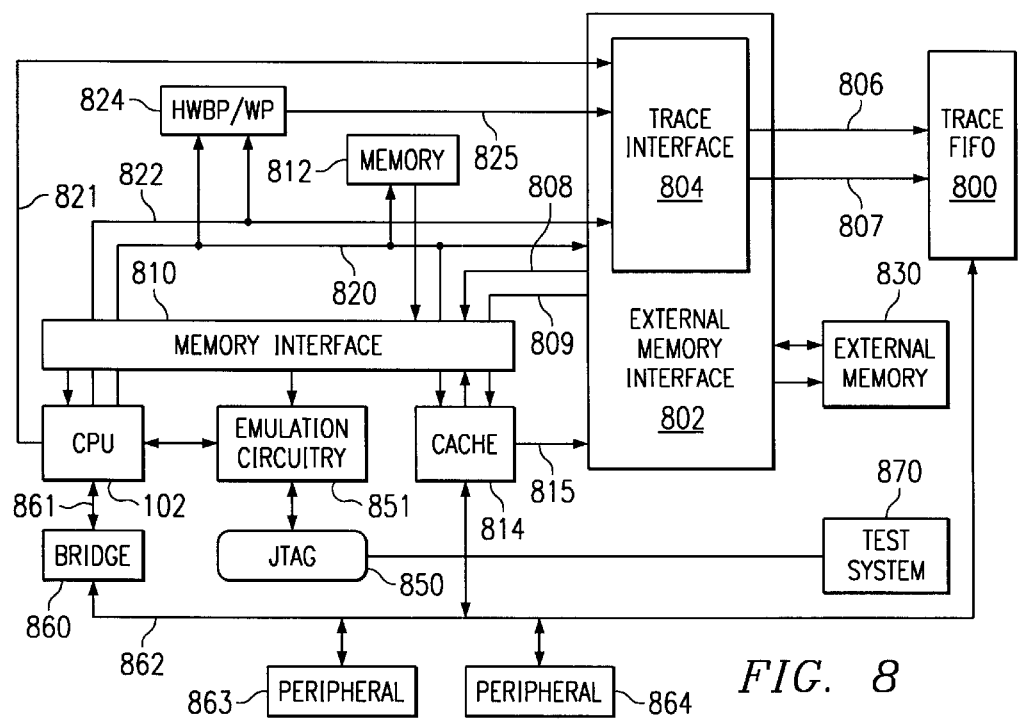
FIG. 8 is a block diagram illustrating a digital system with the processor of FIG. 1 in combination with a trace FIFO, according to aspects of the present invention.

FIG. 8 is a block diagram illustrating a digital system with processor core 102 in combination with a trace FIFO 800, according to aspects of the present invention. Trace FIFO 800 is a mechanism to provide a high bandwidth window providing visibility to the instruction execution sequencing. Processor core 102 is connected to memory interface 810. Instructions and data can be obtained from cache 814, internal memory 812, or external memory 830 via the external memory interface 802. Program fetch address bus 820 provides program counter addresses to cache 814 or memories 812, 830 in response to RPC 534 (see FIG. 5). The cache requests a program fetch from external memory 830 via bus 815 when a cache miss occurs. In this case, instruction data is provided to processor core 102 via bus 808 while the cache is updated via bus 809. Program decode address bus 822 provides the address of the instruction being decoded in response to LRPC 536 to trace interface 804. Trace interface 804 then sends the program decode address to trace FIFO 800 via decode PC bus 806. Hardware breakpoint/window point circuitry 824 monitors address buses 820 and 822 and sends a window signal 825 to trace interface 804 when a pre-selected address or address range is detected. Various control signals relating to instruction format, discontinuities, repeat instructions and interrupts are formed within processor core 102 and sent to trace interface 804 via bus 821. These signals will be described in more detail later.

Still referring to FIG. 8, bridge 860 connects to data bus 861 and provides a buffered data bus, RBus 862. Peripherals 863 and 864 are representative of a variety of peripheral devices that may be connected to Rbus 862. Rbus 862 is also connected to trace FIFO 800 for reading the contents of trace FIFO 800 in order to obtain trace history data or to write to the FIFO in order to control and configure the FIFO.

An external host 870 test system is connected to test port 850 to control emulation and testing. External test system 870 is representative of a variety of known test systems for debugging and emulating integrated circuits. One such system is described in U.S. Pat. No. 5,535,331.

Table 3 lists a memory mapped register within processor core 102 that is relevant to an understanding of this embodiment of the present invention. This register will be described in more detail in the following paragraphs. Processor core 102 also has a number of other memory mapped registers that are used for various control, status, and operational tasks.

TABLE 3

Memory Mapped CPU Register

| MMR Register | Word Address (Hex) | Register Description | Bit Field |
|---|---|---|---|
| ST3 | 37 | System control register | [15–00] |

Table 4 summarizes the bit assignments of status/control register ST3.

TABLE 4

Status/Control Register ST3

| | |
|---|---|
| HOMP | Bit 0: Host only access mode to Peripherals |
| HOMR | Bit 1: Shared access mode to HPI RAM 802 |
| HOMX | Bit 2: Host only access mode: |
| HOMY | Bit 3: Host only access mode: This bit operates the same as HOMX. |
| HINT | Bit 4: Host interrupt |
| XF | Bit 5: External Flag: |
| CBERR | Bit 6: CPU bus error: |
| MP/NMC | Bit 11: Microprocessor/microcomputer mode: |
| AVIS | Bit 12: Address visibility mode: The AVIS status register bit is exported to a memory management interface (MMI) module (not shown) for external RAM/ROM. AVIS is cleared at reset. |
| AVIS = 0 | The external address lines do not change with the internal program address. Control and data lines are not affected and the address bus is driven with the last address on the bus |
| AVIS = 1 | This mode allows the internal program address to appear at a set of output terminals so that the internal program address can be traced. In case of Cache access on top fetch from internal memory, the internal program bus can be traced. The user can for debug purposes disable by software the Cache from the CAEN bit |
| CACLR | Bit 13: Cache clear |
| CAEN | Bit 14: Cache enable |
| CAEN = 1 | Program fetches will either occur from the Cache, from the internal memory or from the direct path to external memory, via the MMI depending on the program address decode. |
| CAEN = 0 | The Cache controller will never receive a program request, hence all program requests will be handled |

TABLE 4-continued

Status/Control Register ST3

| | either by the internal memory or the external memory via the MMI depending on address decode. |
|---|---|
| CAFRZ | Bit 15: Cache freeze |
| ST3[10:7] | Unused status register bits |

Figure 9:
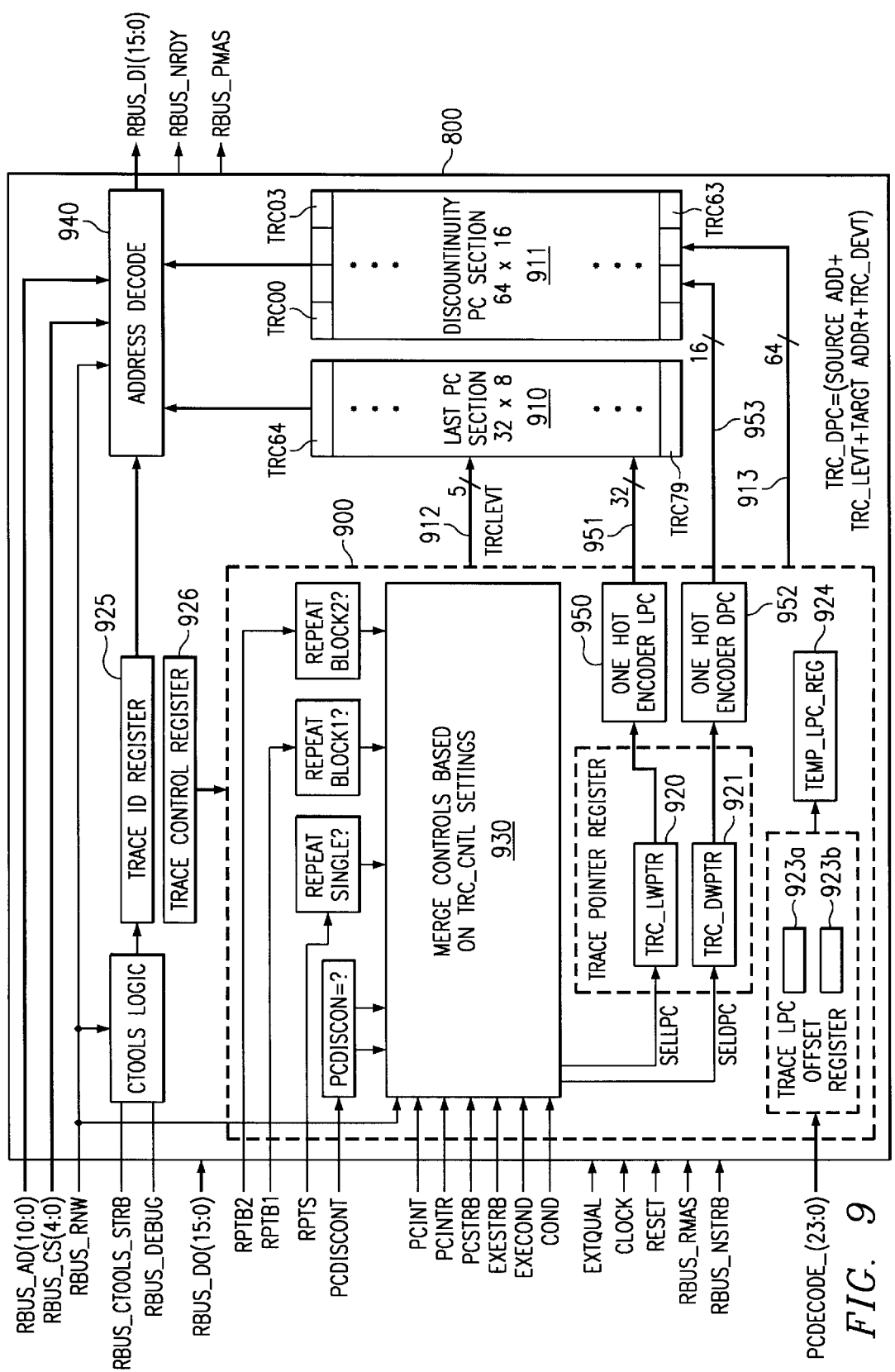
FIG. 9 is a block diagram of the trace FIFO of FIG. 8.

FIG. 9 is a block diagram of the trace FIFO of FIG. 8. Trace FIFO 800 consists of two banks of registers, one containing a sequence of discontinuities and the other containing information to identify a sequence of the most recently accessed PC addresses. This embodiment of trace FIFO 800 stores 32 8-bit samples of the last PC information in last PC section 910 and 16 64-bit samples of the last discontinuities in discontinuity PC section 911. Alternative embodiments may provide storage for a larger or smaller number of samples.

Each sample for the last program counter value (referred henceforth as TRC_LPC) has a bit field which contains information provided by status signals 821 which indicates whether it belongs to a conditional instruction and if the conditional execution resolved to a "true." By default every instruction is assumed to evaluate to a true and this bit is set to "0" only when an conditional instruction fails. There is also a bit field which indicates whether the last PC sample belongs to a repeat single instruction; in which case the decode PC is stored only once. This can however be controlled through the control register. The bit field also gives information about the size of the instruction (instruction format).

The discontinuity PC section consists of the Decode PC value when a PC discontinuity occurs. Each discontinuity is a pair of values: one showing the PC value just before the discontinuity happens and the other showing the PC discontinuity value. The "pcdiscont" signal (active high) from trace interface 804 indicates whether the corresponding address is a discontinuity address.

The interface can be classified into two portions: Rbus specific signals and trace specific signals. Table 5 describes the Rbus specific signals which connect to trace FIFO 800 via Rbus 862. Table 6 describes the trace specific signals which connect to trace FIFO 800 via PC-decode bus 806 and control signal bus 807 and are received by control circuitry 900.

TABLE 5

Rbus specific signals

| Name | Size | Direction | Description |
|---|---|---|---|
| ad(10-0) | 11 bits | IN | Rbus address bus |
| Cs | 5 bits | IN | Rbus Chip select bus |
| do(15-0) | 16 bits | IN | Rbus data out bus |
| Rnw | 1 bit | IN | Rbus read not write ( 1 => Read , 0 => Write) |
| Nstrb | 1 bit | IN | Rbus strobe |
| Rmas | 1 bit | IN | Rbus mas (0 => 8 bits, 1 => 16 bits) |
| ctools_strobe | 1 bit | IN | Rbus ctools decode strobe |
| Debug | 1 bit | IN | Debug/Application Access type |
| di(15-0) | 16 bits | OUT | Rbus Data in Bus |
| Nrdy | 1 bit | OUT | Peripheral ready bit |
| Pmas | 1 Bit | OUT | Peripheral access size ( 0 => 8 bits, 1 => 16 bits) |

TABLE 6

Trace Specific Input Signals

| Name | Size | Description |
|---|---|---|
| Pcdecode(23-0) | 24 bits | Decode PC Value, from LRPC register 536 |
| Pcdist | 1 bit | PC Discontinuity Signal |
| pcint/instrf(2) | 1 bit | Discontinuity due to Interrupt/Instruction format bit[2] |
| pcintr/instrf(1) | 1 bit | Discontinuity due to Return from ISR/Instruction format bit[1] |
| Pcstrb | 1 bit | PC Signal fields are valid |
| Cond | 1 bit | The instruction is a conditional Instruction |
| Execond | 1 Bit | Execute conditional true/false |
| Exestrb | 1 bit | EXE Signal fields are valid |
| Rpts | 1 bit | Repeat Single active |
| rptb1 | 1 bit | Block repeat active |
| rptb2 | 1 bit | Block repeat (nested) active |
| instf(0) | 1 bit | Carries Least Significant bit for Instruction format |
| ext_qual | 1 bit | External Qualifier from break point active |
| Clock | 1 bit | CLOCK signal |
| Reset | 1 bit | Reset signal |

Trace specific input signals PCINT, PCINTR have dual functionality. During sequential code execution they will carry the instruction format. During a code discontinuity they will carry the information explained above. In this manner, fewer signals are required.

CPU 102 exports the program counter address (decode pipeline stage) via bus 822 and a set of status signals from the instruction decode and condition evaluation logic via bus 821 to support tracing of user program execution, as described Table 6. This can be achieved in two ways: by bringing these signals at the edge of the device through external memory interface 802 if acceptable from a pin count and performance standpoint; or by implementing trace FIFO 800 within the same integrated circuit. The latter approach allows tracing of the last program address values and the last program address discontinuities with a tag attached to them for efficient debug. Advantageously, this scheme does not require extra device pins and supports full speed tracing. Table 7 describes various registers and buses within trace FIFO 800.

TABLE 7

Terms used in this description

| | |
|---|---|
| PC | Decode PC value: address of the instruction currently in the decode stage of the instruction pipeline from pcdecode (23-0) |
| TRC_LPC | Decode PC information for the last PC ( Sequential code ). |
| TRC_DPC | Decode PC value in the discontinuity PC section of the FIFO |
| SEC_LPC | register section 910 containing TRC_LPC information |
| SEC_DPC | register section 911 containing TRC_DPC |
| TRC_LWPTR | trace FIFO Last PC Write Pointer 920. Contains the address where the last sample of TRC_LPC was written to. |
| TRC_DWPTR | trace FIFO Discontinuity PC write pointer 921. Contains the address where the last sample of TRC_DPC was written to. |
| TRC_RST | trace FIFO reset: TRC_LWPTR = TRCDWPTR = −1 |
| PCDIST | PC discontinuity signal (pcdiscont): This is an active high signal which goes to "1" whenever there is a PC discontinuity |
| EXECOND | Conditional instruction execution: Set to "0" when a conditional instruction evaluates to "FALSE". Otherwise always true |

TABLE 7-continued

Terms used in this description

| | |
|---|---|
| COND | the instruction corresponding to the decode PC is a conditional instruction. |
| TRC_EVT | bit field used to encode the reason for Trace entry This bit field contains the following information:<br>PCDIST  PC value is a discontinuity when '1'.<br>EXECOND  Execute conditional resolved to a FALSE. Set to "1" in such case, "0" otherwise<br>PCINT:  discontinuity is due to an Interrupt<br>PCINTR:.  discontinuity is due to a return from an Interrupt Service Routine<br>TRC_TPT: Contains repeat Information<br>  00 - No Repeat<br>  01 - Repeat Single<br>  10 - Block Repeat<br>  11 - Block repeat Nested<br>INSTSIZE: Contains information about instruction size<br>  000 - 8 bit instruction<br>  001 - 16 bit instruction<br>  010 - 24 bit instruction<br>  011 - 32 bit instruction<br>  100 - 40 bit instruction<br>  101 - 48 bit instruction<br>  110 - Reserved<br>  111 - Reserved |
| TRC_LEVT | Trace event belonging to last PC section only |
| TRC_DEVT | Trace event belonging to discontinuity PC section only. |
| LPC_OFFSET_REG | A 24 bit offset register 923 holding the PC value. Includes two 16-bit registers, 923a and 923b. |
| EXT_QUAL | Signal 825 from the external break point logic which stays high between 2 successive break points. This signal can be used by any logic which wants to do something with reference to 2 break points. In Trace FIFO this is used to window the trace information. |
| TEMP_LPC_REG | 24 bit register 924 used to temporarily hold the TRC_LPC value. |

LPC_OFFSET_REG 923 is used because no PC bits are stored in SEC_LPC. This register contains the full 24 bit PC value when the FIFO stops for any reason. So in the normal case it will always point to the current decode PC value that belongs to sequential code. However when there is a stop event due to windowing of trace from break point logic 824 or from the windowing options that can be controlled through the Trace control register, the LPC_OFFSET_REG will contain the full PC value at the stop. This means that the user (or the debugger software) has complete information to reconstruct all the address values for sequence of instruction addresses of the most recently used instructions together with the instruction format information.

Each TRC_LPC value is temporarily stored in TEMP_LPC_REG 924 so that for each discontinuity a pair of PC values can be stored: one showing the value just before the discontinuity and the other showing the discontinuity address.

There are several registers used to control Trace FIFO 800. A detailed description of each register follows.

Trace Control Register (TRC_CNTL) 926 is a sixteen bit register used to setup and control the different modes of operation of the Trace FIFO. Table 8 describes the TRC_CNTL bits and gives their default values at reset.

TABLE 8

Trace Control Register Bit Descriptions

| Name | Description | Default Value |
|---|---|---|
| Reserved | Bit 15–10 : Reserved for Future use | |
| TRC_TRIG | Bit 09 : Trace Trigger<br>This bit when set to "1" indicates that the Trace is triggered and is sampling. When set to "0" indicates that no samples are currently being stored. A valid condition of Trace trigger will depend on the values of TRC_INT, TRC_BACK, TRC_EN and TRC_EXTQUAL. This bit is cleared on reset. A software reset preserves the value of the byte written in to the control register. The value of the bit will change depending on the state when trace FIFO comes out of reset. | 0 |
| TRC_EN | Bit 08 : Trace Enable<br>Enable Trace by setting this bit to "1". When set to "0" everything with respect to trace FIFO will be shut off. | 0 |
| TRC_RPT | Bit 07 : Trace Repeat<br>Enable special tracing for repeat Instructions. Setting this bit to "1" will cause all the repeat instructions to unroll and trace all discontinuities during block iterations. In case of repeat single this will cause the same PC information repeated as many times as the instruction is repeated. Setting this bit to "0" will trace only the first iteration in case of block repeats and first PC value in case of repeat single | 0 |
| TRC_EXTQUAL | Bit 06: Trace External Qualifier<br>Enable External Qualifier Control. When set to "1" will use the external qualifier signal to window trace. When set to "0" the external qualifier signal is ignored. The values for TRC_INT and TRC_BACK are valid even when the external qualifier is asserted. | 0 |
| TRC_INT | Bit 05 : Trace Interrupts<br>Enable tracing of Interrupt service routines. When set to "1" will cause only the ISRs to be traced. When set to "0" ISRs are not traced. | 1 |
| TRC_BACK | Bit 04 : Trace background code<br>Enable tracing background ( No interrupt - sequential code) When set to "1" enables tracing background code. When set to "0" disables tracing background code. | 1 |
| TRC_LCK | Bit 03 : Trace Update Lock.<br>When set "1" locks trace buffer from being updated with newer samples. Needs to be set before reading the FIFO. | 0 |
| TRC_RST | Bit 02 : Trace Reset<br>Resets Trace buffer when set to "1". At reset TRC_LWPTR = TRC_DWPTR = −1<br>The Reset Vector is preserved on the control register. The TRC_RST bit must be cleared by application to restart tracing | 0 |
| TRC_STATE | Bit 01–00: Trace State<br>Trace State control and ownership control<br>00 - Release Trace<br>01 - Claim Trace<br>10 - Reserved<br>11 - Reserved | 00 |

Trace Pointer Register (TRC_PTR) is a sixteen bit register that is functionally two different registers: Trace Last PC write Pointer (TRC_LWPTR) 920 and Trace Discontinuity PC write Pointer (TRC_DWPTR) 921. This register is read only. Table 9 describes the trace pointer bits.

TABLE 9

Trace Pointer Register

| | |
|---|---|
| Reserved | Bit 15–14 : Reserved for Future use |
| TRC_LWPTRW | Bit 13: Indicates that all last PC TRACE FIFO locations contain valid data. When this bit is a 0, indicates that samples following TRC_LWPTR to the last (last PC) location are invalid. This bit is cleared to 0 on a TRC_RST. |
| TRC_LWPTR | Bit 12–08 : Trace Last PC write Pointer Trace FIFO Last PC Write Pointer. These bits contain the address of the last PC trace sample written to. The write pointer is where we start to read the buffer. The contents of this pointer reflects the last PC value. Previous PC trace samples are read by adding an offset of −1 to this pointer. The traces are stored in a circular buffer organization. Decrementing the TRC_DWPTR gives earlier samples. When the top of the buffer is reached the pointer rolls around. |
| Reserved | Bit 07 - : Reserved |
| TRC_DWPTRW | Bit 06: Indicates that all discontinuity PC TRACE FIFO locations contain valid data. When this bit is a 0, indicates that Discontinuity PC samples following TRC_DWPTR to the last location are invalid. This bit is cleared to 0 on a TRC_RST. |
| TRC_DWPTR | Bit 05–00 : Trace Discontinuity PC write Pointer Trace FIFO Discontinuity PCWrite Pointer. These bits contain the address of the last discontinuity trace sample written to. The write pointer is where we start to read the buffer. The contents of this pointer reflects the last PC discontinuity. Previous discontinuity trace samples are read by adding an offset of −1 to this pointer. The traces are stored in a circular buffer organization. Decrementing the TRC_DWPTR gives earlier samples. When the top of the buffer is reached the pointer rolls around. |

Trace registers TRC00 through TRC79 are 16-bit registers used to store the trace information. The trace information is separated in to two parts. One part holds the last PC information and the other holds the PC discontinuity value. In the current embodiment, last PC information is stored in registers TRC64 to TRC79 in last PC section 910. Each last PC sample is eight bits, so that two samples are stored in each trace register. Discontinuity PC information is stored in registers TRC00 to TRC63. Each discontinuity sample is sixty four bits, such that four trace registers are used to store each discontinuity sample. In the present embodiment, the Trace FIFO is designed to accommodate 16 samples of previous PC discontinuities and 32 samples of last PC value. Another embodiment may store a greater or lesser number of samples.

Associated with each discontinuity decode PC value is a bit field called the Trace Event (TRC_DEVT). This field specifies the reason for the discontinuity (the event causing the discontinuity). The TRC_DEVT bits are chosen to enable reconstruction of the most recent instruction execution sequencing at any point of time.

Similarly, associated with each entry in the Last PC section is a bit field called TRC_LEVT which specifies information about conditional execution and instruction format. A TRC_LEVT entry is also included with each discontinuity sample.

The FIFO is organized in such a way that newest samples will overwrite oldest samples, in a circular buffer manner. The TRC_LWPTRW Bit and TRC_DWPTRW Bit indicate when a wrap around has occurred. Once wrapped, these bits stay as a 1 until the TRACE FIFO is reset. A description of the Trace registers and the Event qualifiers follows. Each Discontinuity entry is a pair of 32 bit values:

1. First 32 bits address causing discontinuity+TRC_LEVT bits
2. Second 32 Bits Discontinuity Target address+TRC_DEVT bits Table 10 shows the 64 bit value for each discontinuity entry. As explained above, each sample occupies four trace registers, so that a single sample will reside in registers TRC00–TRC03, for example. The trace registers are read as sixteen bit values.

TABLE 10

Trace Registers (Discontinuity PC Section)
TRC00–TRC63 Bit Description

| | |
|---|---|
| TRC_LEVT | Bit 63:56: Trace Event qualifiers<br>Bit 63:61: Reserved<br>Bit 58–60: Instruction Format<br>Bit 57: Execute Conditional (EXECOND)<br>Bit 56: Single Repeat (TRC_RPT) |
| TRC_PC | Bit 55–32: Address Causing Discontinuity |
| TRC_DEVT | Bit 31–24: Trace discontinuity Event<br>Trace Event: This is an 8 bit field which indicates the reason for the discontinuity.<br>Bit 31 : Conditional execution caused discontinuity . . . (EXECOND)<br>Conditional Execution True: This bit, when 1, indicates that the conditional instruction was evaluated to true and it caused a discontinuity<br>Bit 30: Interrupt Service Routine . . . (PCINT)<br>Interrupt Service routine: This bit, when 1, indicates that the PC discontinuity is due to an interrupt.<br>Bit 29: Return from Interrupt PCINTR)<br>Return from Interrupt Service Routine. This bit, when 1, indicates that the PC discontinuity is due to a return from an Interrupt service routine.<br>Bit 28–27: Repeat instruction Information . . . (TRC_RPT)<br><br>00-No Repeat<br>01-No Repeat<br>10-Block Repeat<br>11-Block Repeat Nested<br>Bit 26: PC Discontinuity . . . (PCDIST)<br>Denotes that this address belongs to the first instruction of a discontinuity.<br>Bit 25–24: Reserved |
| TRC_DPC | Bit 23–00: Decode PC Value<br>Decode PC Value |

Trace Registers TRC64–TRC79, Last PC Section 910, contains the last PC information. Table 11 describes the contents of the trace registers which store the last PC samples.

TABLE 11

Trace Registers (Last PC Section) TRC64–TRC79 bit Description

| | |
|---|---|
| INSTF | Bit 04–02: Instruction Format<br><br>Instruction Format<br>000-8 bit Instruction<br>001-16 bit Instruction<br>010-24 bit Instruction<br>011-32 bit Instruction<br>100-40 bit Instruction<br>101-48 bit Instruction<br>110-Reserved<br>111-Reserved |
| EXECOND | Bit 01: Conditional Execution True<br>Execute Conditional: This bit when set to '0' indicates that a conditional execution evaluated to a "FALSE" |

TABLE 11-continued

Trace Registers (Last PC Section) TRC64–TRC79 bit Description

| | |
|---|---|
| RPT | Bit 00: Repeat single information<br>Single repeat instruction: When 1' indicates that the corresponding entry in SEC_LPC value belongs to a single repeat instruction |

Figures 18, 19, 20:
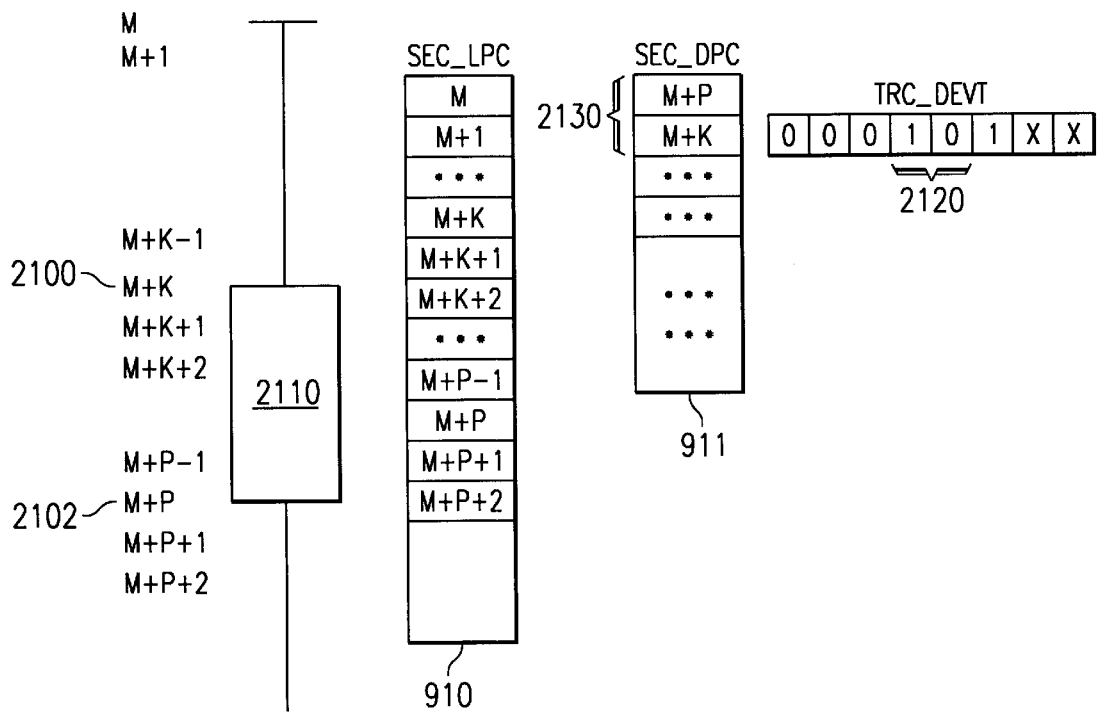
FIG. 18 illustrates the bit assignment of a "discontinuity event" entry stored in the trace FIFO.
FIG. 19 illustrates the bit assignment of a "last PC event" entry stored in the trace FIFO.
FIG. 20 is a conceptual view of handling a block repeat instruction in the trace FIFO of FIG. 9.

FIG. 18 illustrates the bit assignment of a "discontinuity event" entry stored in the trace FIFO. FIG. 19 illustrates the bit assignment of a "last PC event" entry stored in the trace FIFO.

Table 12 describes Trace LPC Offset Register 823. This register contains the current Decode PC value and its TRC_LEVT bits.

TABLE 12

Current Decode PC Value and its TRC_LEVT Bits

| Name | Size | Description |
|---|---|---|
| TRC_LPCOFFSET | 32 bits | Bit 31–29: Reserved<br>Bit 28–24: TRC_LEVT<br>Bit 23–00: Decode PC value |

Table 13 describes the Trace FIFO ID Register 925. This register specifies the "owner identification" of trace FIFO 800. The owner may be debugger software, the application or no current owner. The cTOOLS id for trace emulation feature is also read from here.

TABLE 13

Trace FIFO ID Register Bit Definitions

| Bits | Description |
|---|---|
| TRC_ID | Bits 15–14: Defines the owner of the Trace logic<br><br>Owner:<br>00 Not Owned<br>01 Application Owns<br>10 Debugger Owns<br>11 Reserved<br>13–12: Reserved<br>11–O: Set to 0x004 |

The cTOOLs debugging system ID for Trace buffer is 0x004, which is set in bits 11–0 of ID register 925. The ownership is set to "NONE_OWNS" during a reset. The ownership can be claimed by accessing the control register by writing to control register 926. If already owned, a write to the control register will not change ownership. The resources can be owned when the control register bits (1 downto 0) move to "released."

Table 14 shows the Address mapping of the registers within the trace FIFO.

TABLE 14

Address Map

| Name | Size | CPU Address | External Bus Relative Address |
|---|---|---|---|
| Trace Register (TRC00–TRC63) Discontinuity Section | 64 × 16 bits | 0x004000-<br>0x00407E | 0<br>63 |
| Trace Register | 16 × 16 bits | 0x004080- | 64 |

TABLE 14-continued

Address Map

| Name | Size | CPU Address | External Bus Relative Address |
|---|---|---|---|
| (TRC64–TRC79) Last PC Section | | 0x00409E | 79 |
| Trace LPC Offset Register (TRC_LPCOFFSET) | 2 × 16 bits | 0x0040A0<br>0x0040A2 | 80<br>81 |
| Trace Pointer Register (TRC_PTR) | 16 Bits | 0x0040A4 | 82 |
| Trace ID Register (TRC_ID) | 16 Bits | 0x0040A6 | 83 |
| Trace Control Register (TRC_CNTL) | 16 Bits | 0x0040A8 | 84 |

All Rbus read operations are 16 bit reads. In case of reading trace registers TRC64 through TRC79—Last PC section 910, each read operation will contain 2 last PC values. The lower eight bits will contain the first value and the upper eight bits will contain the next value. This increases the throughput of reads.

Control circuitry 930, ID register 925, and control register 926 will be described in more detail later.

The hardware reset state for all the output signals are described in Table 15.

TABLE 15

Hardware Reset State for all the Output Signals

| Signal | Value |
|---|---|
| Rbus_pmas | 1 |
| Rbus_nrdy | 1 |
| Rbus_di (Rbus data read Bus) | Undefined |

Figure 10:
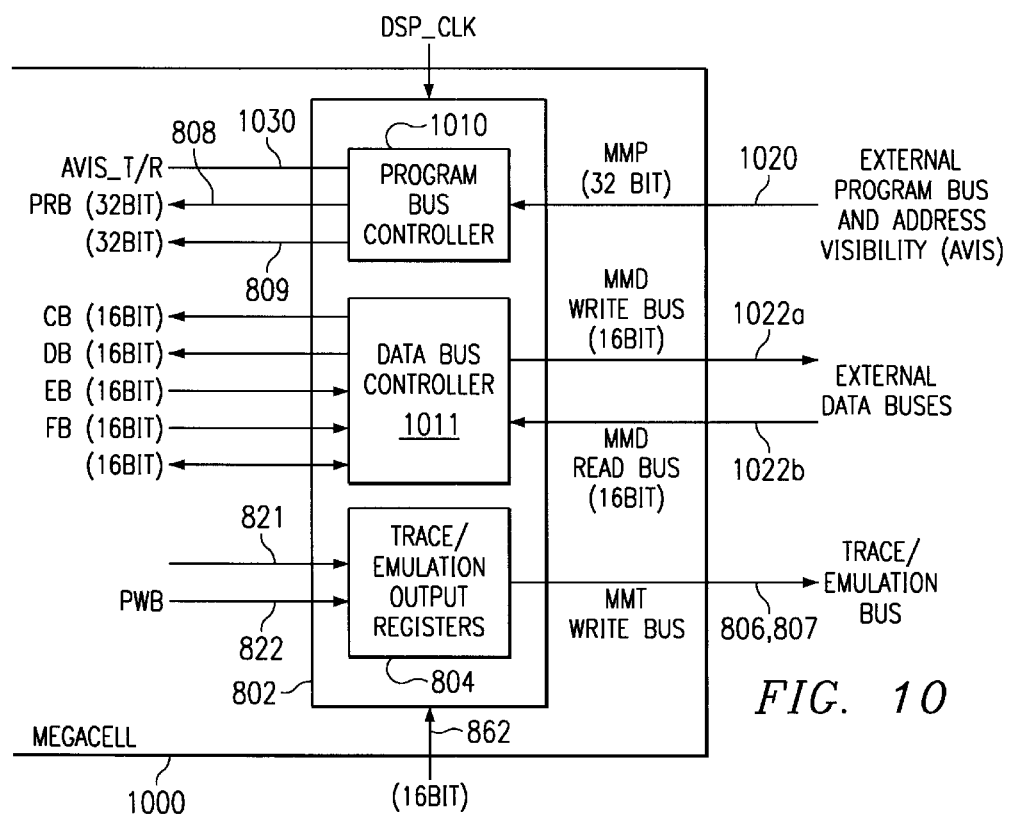
FIG. 10 is a block diagram of the external memory interface of FIG. 8.

FIG. 10 is a block diagram illustrating external memory interface 802 in more detail. The external memory interface comprises separate Program and Data bus controllers 1010, 1011 and a Trace/Emulation interface 804. The data and program bus controllers are separate but the configuration block will be shared. Therefore fetches on the external data bus 1022 and program bus 1020 will run concurrently. Trace/Emulation interface 804 comprises both Generic Trace and Address Visibility (AVIS). The MMT bus 806, 807 is used to output the trace information from the internal Megacell Trace/Emulation block. The AVIS output is multiplexed onto the MMP Program address bus. Megacell 1000 is a complex ASIC device formed by combining several predefined ASIC cells, including processor core 102. External memory interface 802 is also referred to as Megacell Memory Interface (MMI) 802.

The 32 bit Trace/Emulation Interface 804 outputs the current 24 bit execution address via bus 806 and the twelve Generic Trace control signals via bus 807 at each program discontinuity (see Table 6). This information will allow an external post processor, such as test system 870, to reconstruct the program flow. By consulting the program listing, test system 870 can display the actual instruction flow along with comments relating to individual instructions provided in the program listing. As only the discontinuities are output, the average data rate will be a fraction of the DSP_CLK rate.

FIG. 11 is a timing diagram illustrating timing for the trace signals output from the external memory interface. MMI 802 outputs the Generic Trace signals directly from the Generic Trace Block 804 within the Megacell. The Generic Trace outputs comprise the 24 bit execution address and twelve control signals.

The execution address is only output at each program discontinuity where the control signals define the nature of the discontinuity eg. a jump, interrupt or subprogram call. The address bus is 24 bits wide as the execution address may be misaligned even though the program fetch addresses are always 32 bit aligned.

The Generic Trace data will require post processing to reconstruct the program flow if the data was logged, for example, by using external test system 870. An XDS510 emulation system (available from Texas Instruments, Inc) can be configured to do this via 7 pin JTAG interface 850 in conjunction with emulation control circuitry 851.

MMI 802 merely buffers the generic trace signals 1110, 1112 and drives them externally from the falling edge of clock signal 1100 which is consistent with the MMP and MMD external busses such that any future merging would be straight forward. The Generic Trace block will drive generic trace outputs 1120, 1122 from the rising edge of clock 1100 such that the internal bus will only have half of one DSP_CLK period to propagate. However this bus should not dominate the floor plan of megacell 1000, since this bus is point to point, i.e. lightly loaded, and requires no address decoding etc. Alternatively, external trace bus 1120, 1122 could be driven from the rising edge of the DSP_CLK to make it floor plan non-critical.

The Generic Trace output is not handshaked and rate adaptation FIFO 800 is placed externally to Megacell 1000. Statistics vary but if a discontinuity occurs once in every 4 instructions then the average Generic Trace output data rate will be 25% of the instruction execution rate. An alternate embodiment may place FIFO 800 within Megacell 1000.

Generic trace control outputs 1122 may be logically ORed together and connected to the SHIFT_IN input of an external synchronous FIFO which is clocked by DSP_CLK. Alternative topologies may be considered for the external FIFO, such as:
a. One small to medium sized FIFO. This FIFO must operate at the full speed of the DSP_CLK.
b. One small rate adaptation FIFO and a large bulk storage FIFO. The small FIFO would be connected between the MMI and the large FIFO. The small FIFO must operate at the full speed of DSP_CLK and be sized to buffer the data peak rates where discontinuities are close together. The large FIFO may then be optimized for area and then only needs to operate at the average rate which discontinuities are encountered. To conserve chip area his large FIFO could be constructed using external on chip SRAM which would revert to application SRAM when Generic Trace was disabled.

When the avis_tr input 1030 is asserted in response to the AVIS bit in control register ST3, the MMI enters AVIS mode where every CPU fetch address which is output on internal Pbus 820 will also be output on the external program address bus 1020. During normal operation the addresses for internal devices will not be output on the external bus in order to conserve power. Normally when in AVIS mode the cache controller will be disabled to guarantee that external program bus slots are always available.

Each new AVIS address will be signaled on the external program bus via an external mmi_validavis_nf pin which may be used as a clock enable signal on a FIFO which is clocked by DSP_CLK.

Therefore, with the Cache Controller and AVIS disabled only the external device addresses are driven externally, as shown at transition 1210 in FIG. 12. FIG. 12 is a timing diagram illustrating memory cycle timing with caching and tracing disabled. AVIS signal 1200 is disabled, external bus request signal 1202 is asserted only for an external address, and external address signals 1204 transition only at transition 1210 for an external address.

Figure 13:
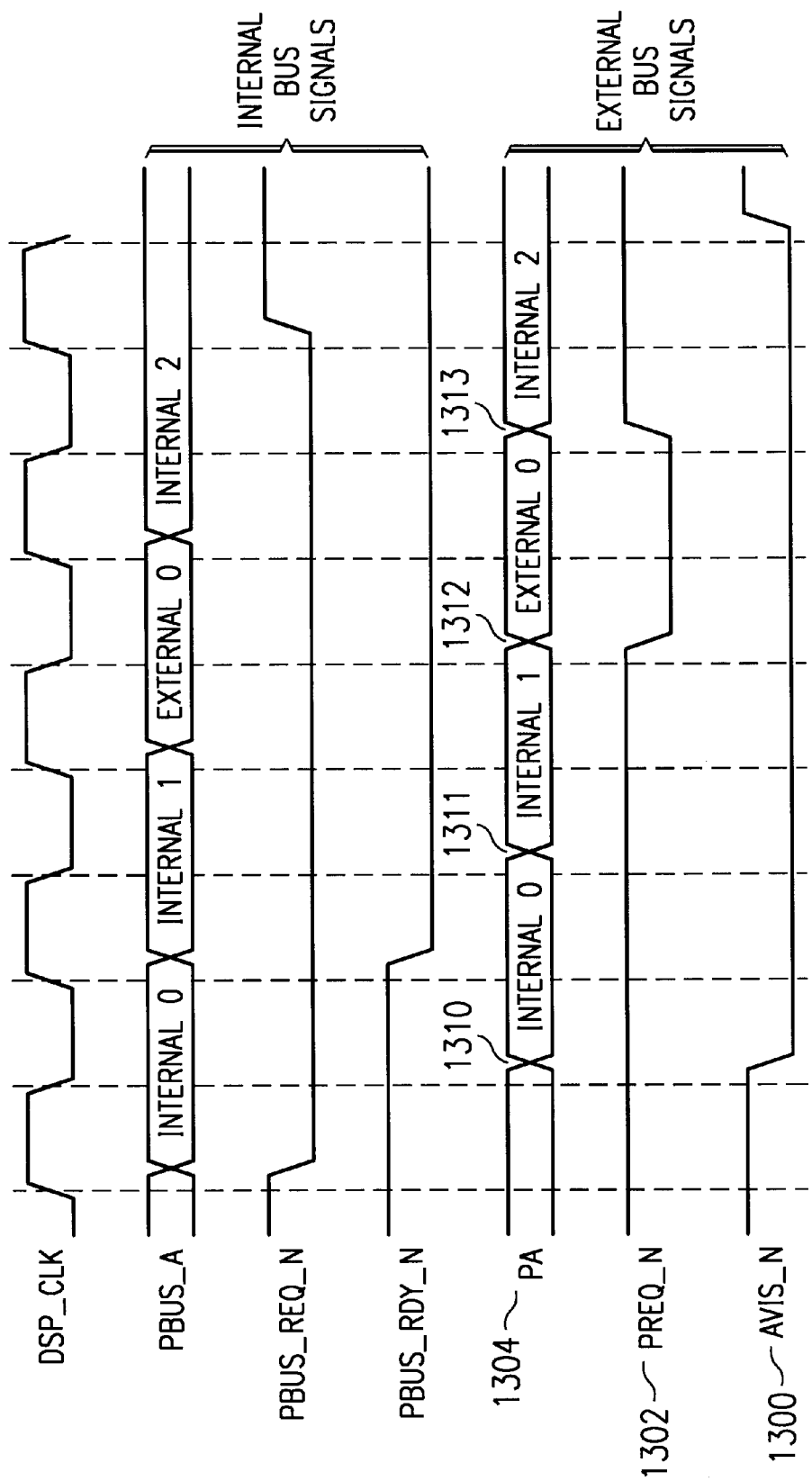
FIG. 13 is a timing diagram illustrating memory cycle timing with caching disabled and tracing enabled.

However, with the Cache Controller disabled via the CAEN bit in ST3 and AVIS enabled both the internal and external device addresses are driven externally as shown below in FIG. 13. FIG. 13 is a timing diagram illustrating memory cycle timing with caching disabled and tracing enabled. AVIS signal 1300 is enabled, bus request signal 1302 is asserted during an external address at transition 1312, while internal and external addresses are driven on the external program address signals 1304 at transitions 1310–1313.

The Cache Controller is usually disabled during AVIS mode so that the external bus is always available to output the AVIS addresses. Similarly if the Cache Controller is enabled and the Pbus 820 addresses are for SARAM or DARAM or are hitting Cache the external bus is always available to output the AVIS addresses.

If the Cache Controller is enabled when AVIS is also enabled then both the Cache Controller and the internal Pbus will be competing for external Pbus 1020. If the Pbus fetches to an external cacheable address which results in a cache miss then the cache controller will start a burst fill to the MMI. The MMI will then put these addresses out externally and if the external device has a long latency then the data will not be returned for some time. If during this time processor core 102 abandons the Pbus fetch by asserting pdismiss_nr and starts fetching from internal SARAM then it will be impossible for the MMI to output the internal AVIS addresses unless the external device supports aborts.

Therefore if the external devices do not support aborts then avis slots will be missed as the cache burst will be indivisible. This means that the resulting emulation trace will not be complete. However the system performance will be higher as cache fills will be able to run concurrently with fetches from internal devices.

The AVIS address output is not handshaked and any rate adaptation FIFO is placed externally to the MMI. As every fetch address is output a new AVIS address could be output on every DSP_CLK cycle. AVIS is enabled via Control Register ST3. When AVIS is enabled the power consumption will increase since the external address lines will be driven during every internal program accesses by processor core 102.

Figure 14:
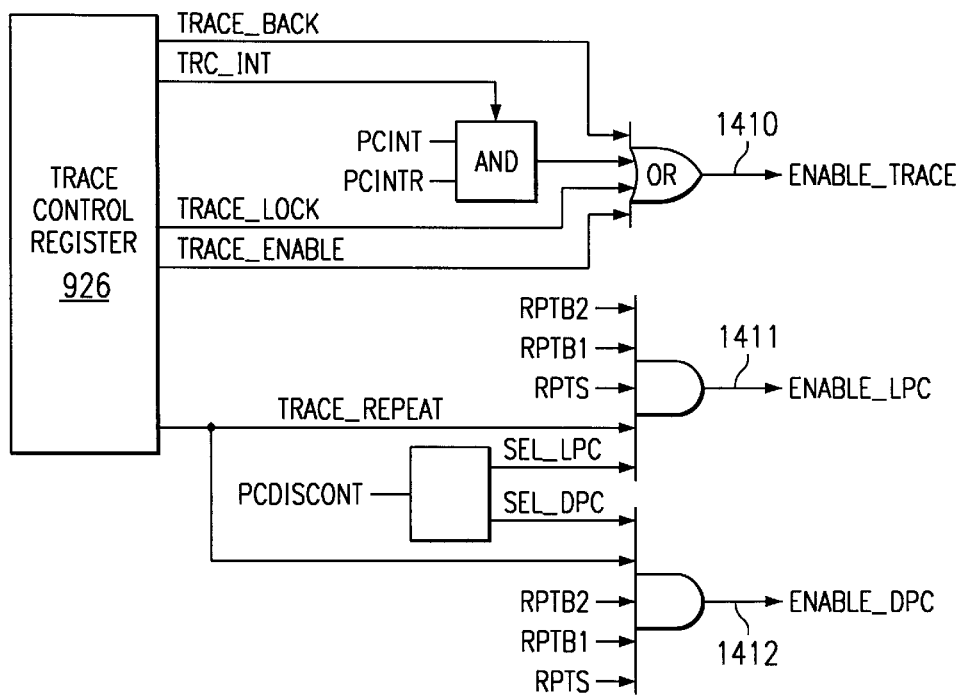
FIG. 14 is a block diagram illustrating the merging of the control signals with the Trace Control Register settings.

The Trace FIFO will now be described in more detail. FIG. 14 is a block diagram illustrating the merging of the control signals with the Trace Control Register settings. Various signals from control register 926 (see Table 8) are combined with various control signals provided by trace interface 804 (see Table 6) as shown to form an enable trace signal 1410, an enable last PC signal 1411 and an enable discontinuity signal 1412.

Figure 15:
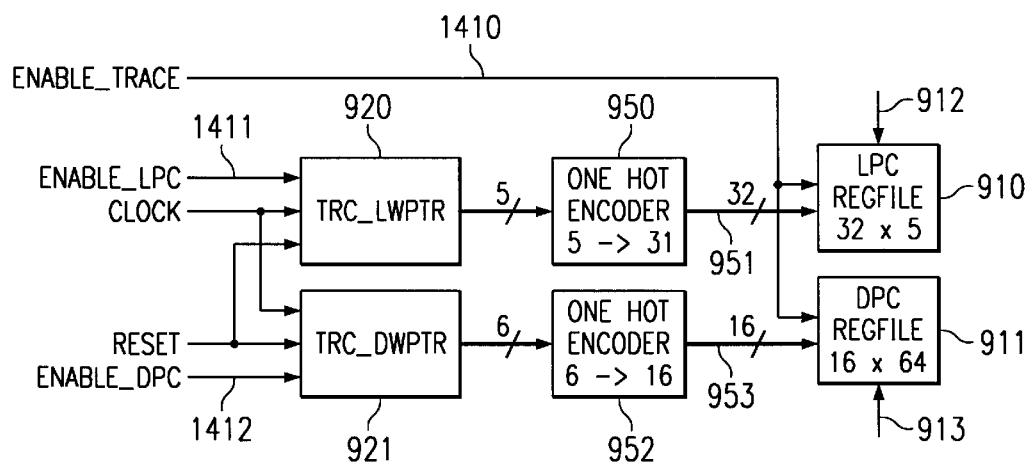
FIG. 15 is a block diagram illustrating how individual registers in the Trace FIFO are addressed while writing trace information.

FIG. 15 is a block diagram illustrating how individual registers in the Trace FIFO are addressed while writing trace information. If enable signal 1410 is asserted, then either LPC registers 910 or DPC registers 911 are selected by enable LPC signal 1411 or enable DPC signal 1412, respectively. If enable LPC signal 1411 is asserted, then a five bit register number stored in TRC_LWPTR 920 is encoded to one of thirty-two select signals 951 by one hot encoder 950. Likewise, if enable DPC signal 1412 is asserted, a six bit register number stored in TRC_DWPTR 921 is encoded to one of sixteen select signals 953 by one hot encoder 952. The selected register then stores either the TRC_LEVT sample presented on bus 912 or the 64 bit TRC_DPC sample presented on bus 913.

Figure 16:
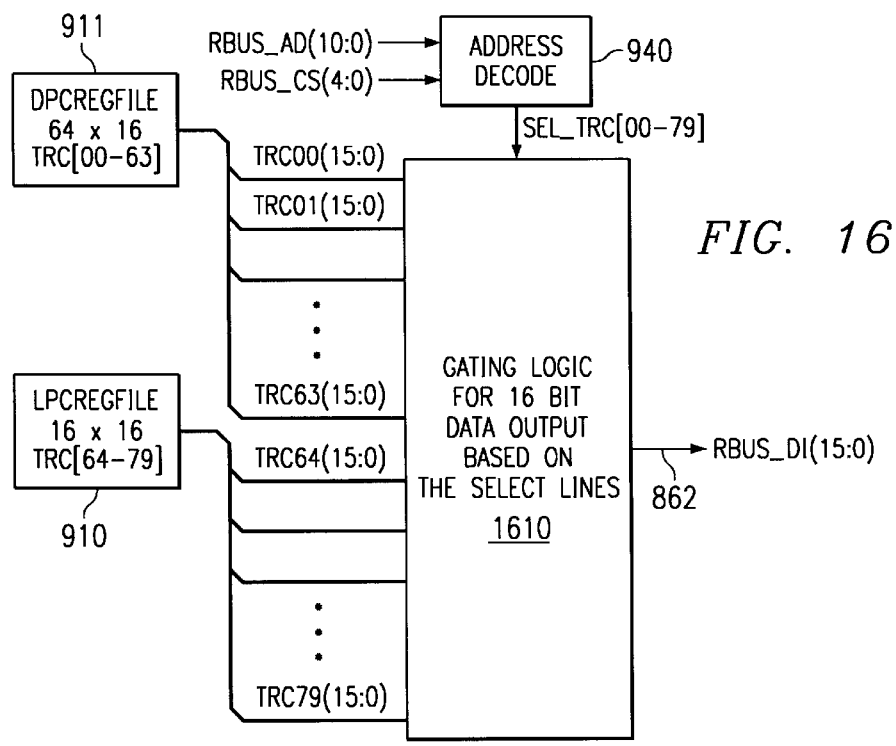
FIG. 16 is a block diagram illustrating how the Trace Registers are addressed for R-bus read access.

FIG. 16 is a block diagram illustrating how the Trace Registers are addressed for R-bus read access. Address decode circuitry 940 decodes a data read address presented on Rbus 862 for a selected FIFO trace register. Gating circuitry 1610 selects the corresponding register and provides the contents of the selected register to Rbus data input signals of Rbus 862.

Figure 17:
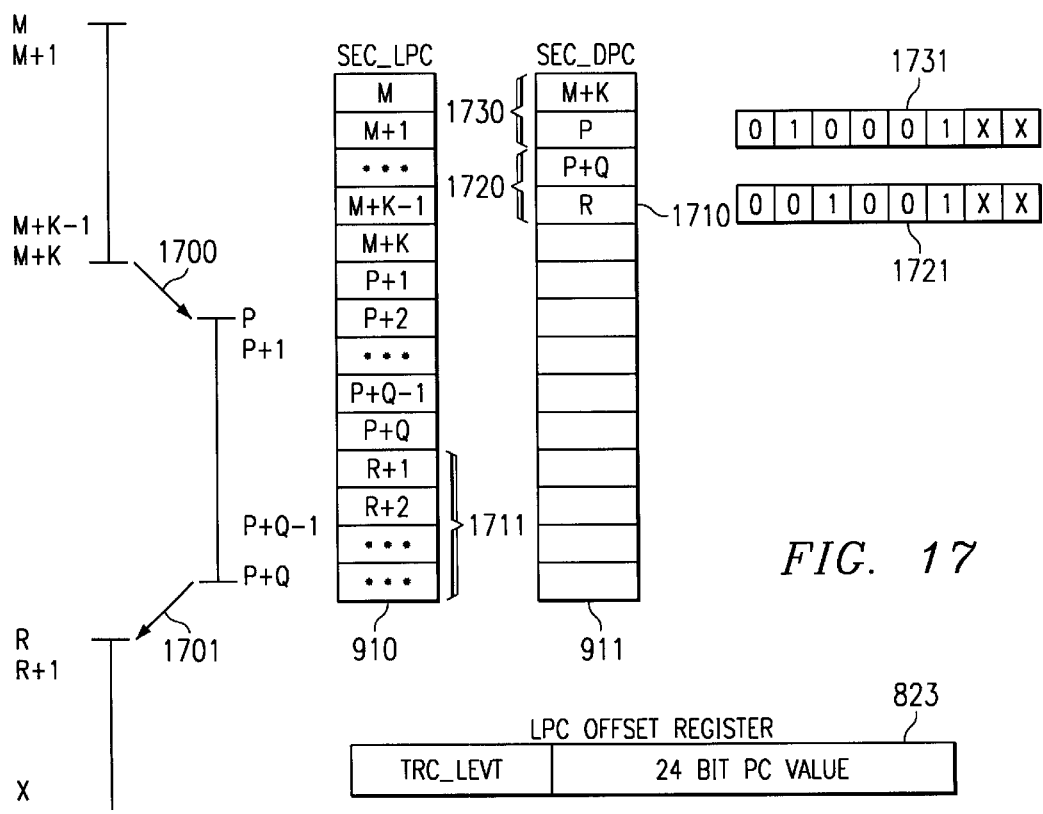
FIG. 17 is a conceptual view of a discontinuity that has been traced by the FIFO of FIG. 9.

Various algorithms used during tracing will now be described in detail. Refer back to Table 7 for various terms that will be used to describe the algorithms. FIG. 17 is a conceptual view of a discontinuity that has been traced by the FIFO. Control of processor core 102 has been taken over by debug software due to detection of a breakpoint address, for example; therefore, FIFO 800 has stopped tracing. Discontinuities due to an interrupt 1700 and a subsequent return 1701 are illustrated. The current decode PC value, which is address X, is obtained from the LPC OFFSET REGISTER. The section of code between this value and the last entry 1710 in SEC_DPC is linear, addresses R to X in this example. The instruction format information is available in the TRC_LEVT samples 1711, see FIG. 19 and Table 11, which can be used to construct all the addresses in this range.

In the FIG. 17, SEC_LPC and SEC_DPC are shown to be of equal depth but the actual implementation is not so. Further note that only the TRC_LEVT bits, see Table 11, are stored in SEC_LPC corresponding to each address shown.

The following tables illustrate various algorithms using Pseudo-code to describe the process involved in each case. The "&" symbol indicates "both the operands." Table 16 describes the algorithm for storing a sample in either the LPC section or the DPC section.

TABLE 16

Pseudo-Code for Storing a Sample

```
process(clock)
begin
    if(clock'event and clock = '1') then
        if(pcdist != 1) then
            TRC_LWPTR ++;
            SEC_LPC = TRC_LEVT;
            TEMP_LPC_REG = PC;
        else
            TRC_DWPTR ++;
            SEC_DPC = TEMP_LPC_REG & TRC_LEVT;
            TRC_DWPTR++;
            SEC_DPC = PC & TRC_DEVT;
        end if;
    end if;
end
```

Table 17 describes the instruction size calculation algorithm.

TABLE 17

Instruction Size Calculation Algorithm

```
process(clock)
begin
    if(clock'event and clock = '1') then
        if(pcdist != 1) then
            INSTR_SIZE = PCINT & PCINTR & INSTF;
            TRC_LWPTR++;
            SEC_LPC = INSTR_SIZE & EXECOND & RPTS;
        else
            TRC_DWPTR++;
            SEC_DPC = TEMP_LPC_REG
            TRC_DWPTR ++;
```

TABLE 17-continued

Instruction Size Calculation Algorithm

```
            SEC_DPC = PC & TRC_EVT
        end if;
    end if;
end process;
```

The instruction format associated with each Decode PC value is the instruction format for the previous instruction. This allows a prior PC value to be reconstructed from the latest value.

The Trace FIFO is reset by writing a "1" in the bit field TRC_RST of the Trace Control Register (TRC_CNTL) or by applying a "1" in the "reset" input signal. Table 18 describes the reset behavior of the trace FIFO.

TABLE 18

Reset Behavior

```
process(clock)
begin
    if(clock'event and clock = '1') then
        if((TRC_RST or reset) = '1') then
            TRC_LWPTR = TRC_DWPTR = -1;
            /* Also all the bits in the trace control register are set to their
reset values
            / * A Software reset will preserve the control register value
written
            /* along with reset. The TRC_RST bit must be
            cleared to restart
            /* from software reset */
        end if;
    end if;
end process;
```

Processor core 102 has a "repeat( )" instruction that causes the next single instruction to be repeated a selected number of times. Processor core 102 also has a "blockrepeat( )" instruction that causes a specified block of instructions to be repeated a selected number of times. The discontinuities caused by repeat instructions are treated with special care. The trace FIFO handles discontinuities caused by a single repeat instruction, a block repeat instruction and repeat instructions (either repeat single or block repeat) within repeat instructions. For single repeat instructions, the PC is frozen and there is no discontinuity. According to an aspect of the present invention, the discontinuities caused by repeat instructions are stored only once for the duration of the repeat instruction.

An advantage of this approach is to prevent the quick filling of the trace FIFO with the same discontinuities which does not provide any additional information during debugging. However the debugger has an option of unrolling all the information inside the repeat blocks by setting the TRC_RPT bit in trace control register 926. In this case the repeat instructions are not distinguished.

Table 19 (see Table 6) describes various signals which come in to play to handle tracing of the repeat instruction.

TABLE 19

Signals Used in Tracing a Repeat Instruction

| | |
|---|---|
| RPTS | A signal showing that a repeat single instruction is active. This signal is active for the duration of the repeat single instruction |
| RPTB1 | A signal showing that a block repeat is in progress. |

TABLE 19-continued

Signals Used in Tracing a Repeat Instruction

This signal goes high at the end of the second instruction within a block repeat and stays high for the entire duration of the block repeat.
RPTB2  A signal showing that a block repeat instruction within a block repeat is in progress. This signal goes high at the end of the second instruction within a block repeat and stays high for the entire duration of the block repeat.

FIG. 20 is a conceptual view of handling a block repeat instruction in the trace FIFO. A blockrepeat( ) instruction at address M+K (2100) causes the block of instructions 2110 between addresses M+K and M+P (2102) to be repeated a selected number of times. However, SEC_DPC advantageously has only a single sample 2130, regardless of the number of times block 2110 is repeated. Trace repeat field 2120 (see FIG. 18 and Table 10: Trace Registers (Discontinuity PC Section) TRC00–TRC63 Bit Description) indicates that a block repeat discontinuity has occurred. Table 20 describes the process to detect Block Repeat 1, which indicates a block repeat instruction is being executed.

TABLE 20

Process to Detect Block Repeat 1

```
process(clock,RPTB1)
begin
    if(clock'event and clock = '1') then
        if ( ( PCDIST and RPTB1) = '1') then
            # Block repeat 1 is active. Stop Tracing
            TRC_DWPTR ++;
            SEC_DPC = TEMP_LPC_REG;
            TRC_DWPTR ++;
            SEC_DPC=PC &TRC_EVT
                TRC_LCK = '1';
            end if;
        end if;
end process;
```

Figure 21:
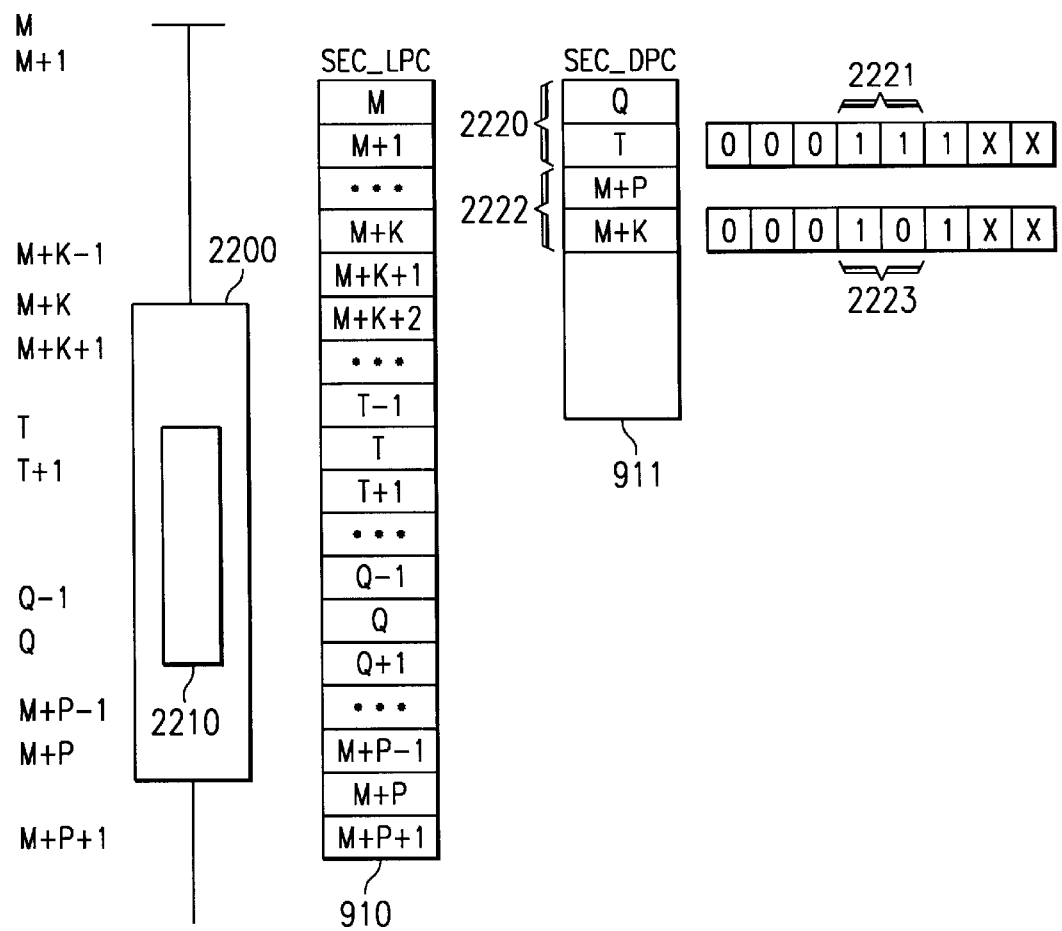
FIG. 21 is a conceptual view of handling a nested block repeat instruction in the trace FIFO of FIG. 9.

FIG. 21 is a conceptual view of handling a nested block repeat instruction in the trace FIFO. Within repeated block 2200 is another repeat block 2210. Advantageously, only a single sample 2220 is stored in SEC_DPC 911 to indicate nested block 2210, as indicated by repeat field 2221. A single sample 2222 is stored to indicate repeated block 2200, as indicated by repeat field 2223. Table 21 describes the process to detect Block repeat2 which indicates nested block repeat instructions are being executed.

TABLE 21

Process to Detect Block repeat2

```
process(clock,RPTB1,RPTB2)
begin
    if(clock'event and clock = '1') then
        if( (( PCDIST and RPTB1) and RPTB2) = '1') then
            # Block Repeat 2 is active. Load the
            new discontinuity and suspend tracing again
            TRC_LCK = '0'
            TRC_DWPTR ++;
            SEC_DPC = TEMP_LPC_REG;
            TRC_DWPTR ++;
            SEC_DPC = PC & TRC_EVT
                TRC_LCK = '1';
            end if;
        end if;
end process;
```

Figure 22:
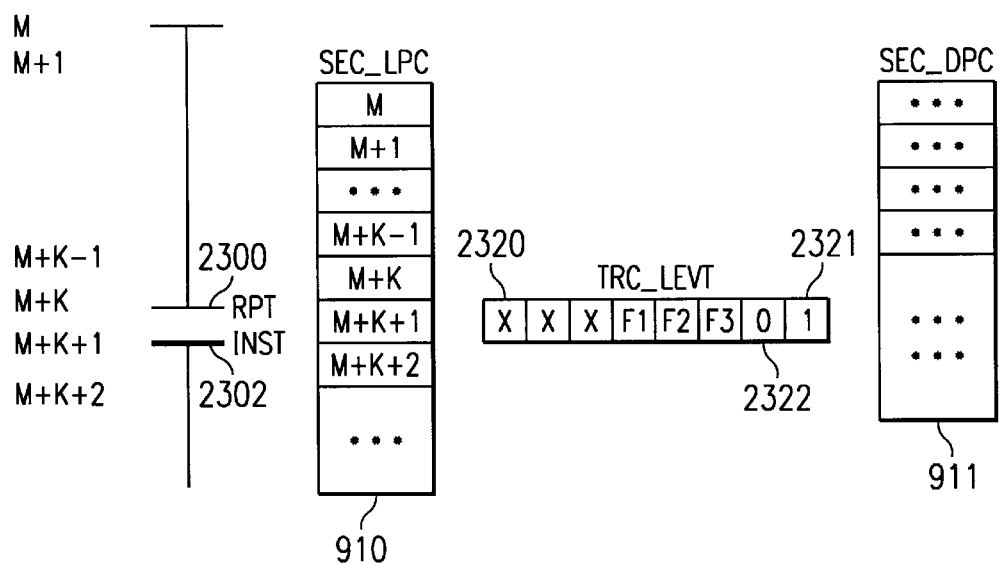
FIG. 22 is a conceptual view of handling a single repeat instruction in the trace FIFO of FIG. 9.

FIG. 22 is a conceptual view of handling a single repeat instruction in the trace FIFO. A repeat instruction 2300 at address M+K causes instruction 2302 at address M+K+1 to be repeated a selected number of times. In this case, no discontinuity samples are stored in SEC_DPC 911. However, in the TRC_LEVT 2320 which corresponds to the repeated instruction, the RPTS bit 2321 is set to indicate that a repeat single instruction is being executed. In this case, instruction 2302 is not a conditional instruction, so the EXECOND bit 2322 is not set. Table 22 describes the process to detect Repeat single.

TABLE 22

Process to Detect Repeart Single

```
process(clock,RPTS)
begin
    if(clock'event and clock = '1') then
        if(RPTS = '1') then
            # Note a single repeat could be occurring
                inside a block repeat
            # Hence the detection of the RPTB* signals,
                which would
            # otherwise be locking the FIFO
            if( ( RPTB1 or RPTB2 ) != 1 ) then
                TRC_LWPTR ++;
                    SEC_LPC = PC & TRC_EVT;
                TRC_LCK = '1';
            else
                TRC_LCK = '0';
                TRC_LWPTR ++;
                    SEC_LPC = PC & TRC_EVT;
            end if;
        end if;
    end if;
end process;
```

If there is a discontinuity due to a conditional instruction inside a repeat block then the sequence of execution can be different in the iteration in which the conditional is evaluated to true from other iterations in which the conditionals evaluate to false. Table 23 illustrates a typical example.

TABLE 23

Example Code With a Conditional Instruction in a Repeat Block

LABELx:REPEAT BLOCK 1 LABEL1 ← Denotes the end of RPTB1

. . .
. . .

If (cond) goto LABEL2 ← Denotes the target of the goto

. . .

LABELy: REPEAT BLOCK 2 LABEL 3 ← Denotes the end of RPTB2

. . .
. . .

LABEL3 : END OF RPTB2

. . .

LABEL2 : TARGET OF GOTO

. . .

LABEL1 : END OF RPTB1

As shown in Table 23, the iteration in which "cond" is evaluated to "TRUE" has a different execution sequence than the iterations in which "cond" is evaluated to "FALSE." Such a case is handled by noting there is a discontinuity due to a conditional instruction inside a repeat block then even if TRC_RPT=0 (Implies store repeat block iteration only once) and then the tracing is not stopped at the end of the iteration but continues in to the next iteration. This process is iteratively applied till an iteration is reached in which the "cond" is false and the repeat block executes like a straight line code. This approach traces the correct instruction execution sequencing.

In the case in which a call instruction inside a repeat block causes another repeat block to be executed then this is considered as level 2 nesting. Table 24 illustrates a typical case. In this case, even if TRC_RPT=0 only RPTB2 is compressed. RPTB1 will be traced fully for all iterations.

TABLE 24

A Call Instruction Within a Repeated Block

Labelx REPEAT BLOCK 1 LABLE1 ← Deontes End of RPTB1
. . .
. . .
  CALL ADDRESS
LABEL1 : END OF RPTB1
ADDRSS : TARGET OF CALL
. . .
. . .
LABELy : REPEAT BLOCK2 LABEL2 ← Denotes end of RPTB2
. . .
. . .
LABEL2 : END OF RPTB2
. . .
LABELz : RETURN Another special case is provided for tracing in the presence of interrupts. When TRC_BACK=1 and TRC_INT=0 in trace control register 926, only the background code will be traced. While the code execution inside the interrupt service routine (ISR) is not traced, the discontinuities due to the entry and exit of the ISR are stored in the discontinuity PC section of the trace FIFO.

A 3 bit counter is used to preserve the context of ISR. This counter is incremented by "1" whenever an interrupt is taken (PCINT=1) and decremented when Interrupt returns (PCINTR=1). The value of the counter is 0 at reset. This counter is used so that when only TRC_BACK is set all interrupt tracing is blocked.

The Trace FIFO provides a mechanism by which a specific section of the code can be traced. A start address and an end address of the code is specified by loading window breakpoint circuitry 824. The signal EXT_QUAL 825 become active for the duration between these 2 matches. A bit field in control register 926 called TRC_EXTQUAL is used to control the trace FIFO entering this mode. This feature allows a small code fragment to be traced alone without tracing the entire code. In this mode, the trace FIFO will be active only for the duration of the EXT_QUAL signal from the breakpoint logic. The bits TRC_INT and TRC_BACK in the TRC_CNTL register are still valid even in this mode. Advantageously, this allows tracing of interrupts which occur in a small portion of the code. To go back to normal tracing mode, a "0" is written in the TRC_EXTQUAL field.

The process for reconstructing an instruction address sequence will now be described in more detail. Referring again to FIG. 17, LPC OFFSET REGISTER 823 holds the decode PC value for the latest instruction, along with the TRC_LEVT bits. The TRC_LEVT field and TRC_DEVT fields are illustrated in FIG. 18 and FIG. 19, respectively. The F2, F1 and F0 bits in TRC_LEVT give the length format of the previous instruction.

The sequence of steps for reconstructing the sequence of instruction addresses by interpolating between each discontinuity in the sequence of discontinuity addresses is as follows:

1. Read LPC OFFSET Register 823, which contains address X
2. Read the Last sample 1720 in SEC_DPC 911, which includes a pair of 32 bit values, P+Q and R.
3. The second value, R, in the pair is the target of the discontinuity and it is marked as such in TRC_DEVT field 1721.
4. The address range from this discontinuity address R to the address X in LPC OFFSET REGISTER is sequential code. All the addresses in this range can be reconstructed by iteratively subtracting the instruction format value in each sample of sequence 1711 from the value in LPC OFFSET Register.
5. When the value of address R is reached, it is then inferred that the end of this segment has been reached. In this manner, all the addresses in the range R to X are reconstructed.
6. The first 32 bit value P+Q in the SEC_DPC sample 1720 shows the full 24 bit address that caused the discontinuity. The TRC_LEVT bits along with it, not shown, has the format information. This value is used in place of the value in the LPC OFFSET register for the next range.
7. By repeating Steps 2 through 5 all addresses in the range P through P+Q are reconstructed.
8. Repeat steps 2–6 until the beginning of the SEC_DPC is reached.

Figure 23:
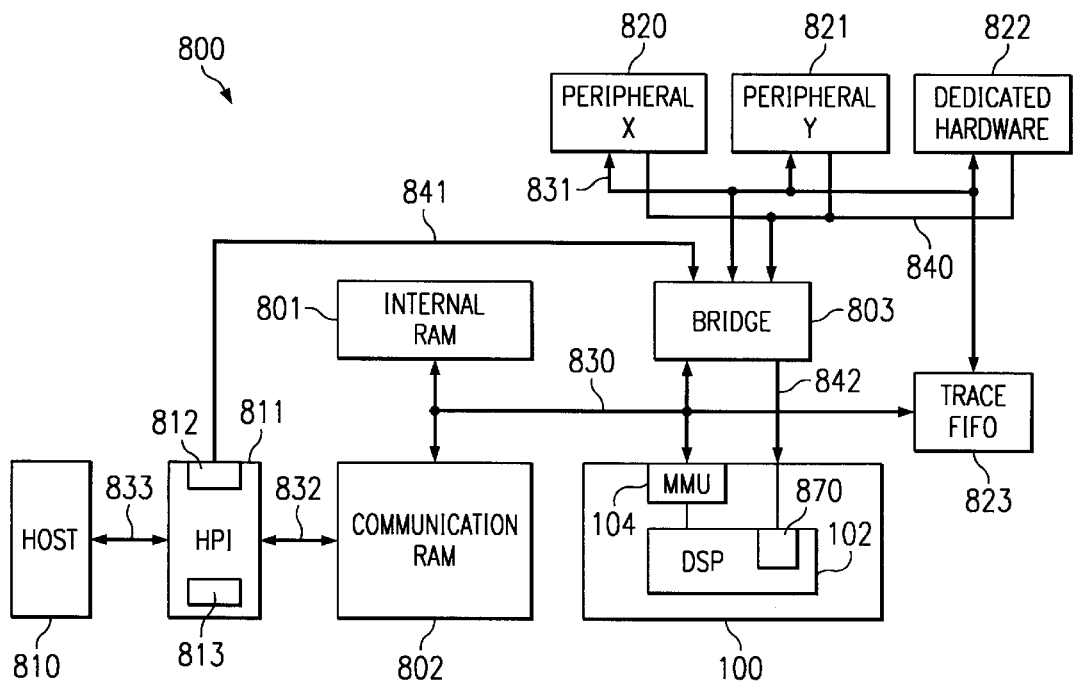
FIG. 23 is a block diagram illustrating an alternative embodiment of a digital system with the processor of FIG. 1, according to aspects of the present invention.

In order to read the trace registers, the following method for reading the FIFO is used:

1. Set TRC_LCK bit in the Trace Control Register to "1," otherwise the read transaction will time out.
2. Read the LPC OFFSET REGISTER
3. Read Trace Pointer Register 920–921 to determine the latest circular buffer entry point in SEC_LPC and SEC_DPC. From the pointer values the correct Rbus addresses are determined. Check TRC_LWPTRW Bit 13 and TRC_DWPTRW Bit 06. These bits are an indication that the FIFO pointers have wrapped around. Without this indication it could be difficult to tell whether there were three valid samples or thirty five for the last PC case. Once wrapped, the extra most significant bit stays a 1 until the TRACE FIFO is reset, so it's not like an extra bit of counter. Advantageously, this avoids reconstructing possible garbage values, such as in the case the TRACE FIFO had not filled at least once.
4. Read the FIFO completely. Read the appropriate set of trace registers in SEC_DPC pointed to by TRC_DWPTR 921. Each entry in the SEC_DPC is a 32 bit value and it will take two Rbus read operations to get the entire value. As described earlier, each complete discontinuity sample includes two entries. Read the appropriate set of trace registers in SEC_LPC pointed to by TRC_LWPTR 920. Each entry in SEC_LPC is 8 bits wide. So each Rbus read operation will give 2 entries from SEC_LPC. The Latest Value will be available in the Lower half of the Rbus data bus
5. Set TRC_LCK to "0" to resume tracing FIG. 23 is a block diagram illustrating an alternative embodiment of a digital system with DSP 100, according to aspects of the present invention. Digital system 800 includes processor 100, as described earlier, and a second processor referred to as host processor 810. DSP core 100 performs digital signal processing related tasks, while host processor 810 performs other application tasks. DSP 100 is connected to an internal program memory circuit 801 and to a dual ported communication memory circuit 802 via bus 830. Trace FIFO 823 monitors bus 830 in order to sample the instruction fetch addresses. Bridge 803 is also connected to bus 830 and provides access to peripherals 820 and 821 via bus 831. Access is also provided via bus 831 to dedicated hardware 822, which includes various devices and circuits, such as timers, power controls, debugging and emulation circuitry, and such. Trace FIFO 823 is also connected to bus 831 in order to provide access to the trace FIFO in order to access the trace data stored therein. Interrupt request signals 840 provide interrupt requests from devices 820–822 to DSP 100.

Host processor 810 is connected to host processor interface circuit (HPI) 811 via bus 833. HPI 811 provides buffering and timing control to allow host processor 810 to access communication memory circuit 802 via bus 832. In this manner, host processor 810 can store and access data values in communication memory 802 that can also be stored and accessed by DSP 100. Bus 832 is separate from bus 830 and communication memory 802 is arranged such that host processor 810 can access data values in dual ported memory circuit 802 in a manner that does not impinge on the operation of memory circuit 801. Interrupt request signals 841 provide interrupt requests from host processor 810 to DSP 100.

Host Port Interface 811 has two registers, an interrupt register 812 for asserting interrupt requests and status register 813 for the HPI operational modes. Both registers are accessible by host 810 via bus 833. Interrupt register 812 is operable to assert host interrupt requests to processor 100 in response to a write transaction from host 810. In the present embodiment, eight bits are selected to provide eight host interrupt request signals. An interrupt request pulse will be formed on one or more of the eight host request signals 841 each time the host writes a "1" into the bit associated with each host interrupt request in the interrupt register 812. Another embodiment may have a fewer or a greater number of interrupt request signals associated with a host processor.

Figure 24:
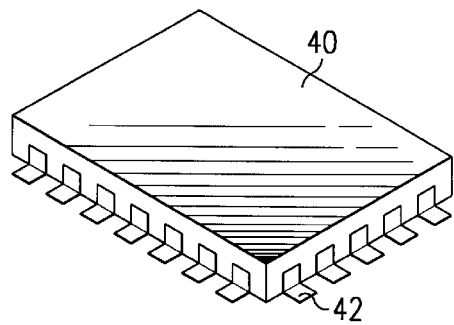
FIG. 24 is a schematic representation of an integrated circuit incorporating the processor.

FIG. 24 is a schematic representation of an integrated circuit incorporating processor 100. As shown, the integrated circuit includes a plurality of contacts for surface mounting. However, the integrated circuit could include other configurations, for example a plurality of pins on a lower surface of the circuit for mounting in a zero insertion force socket, or indeed any other suitable configuration.

Figure 25:
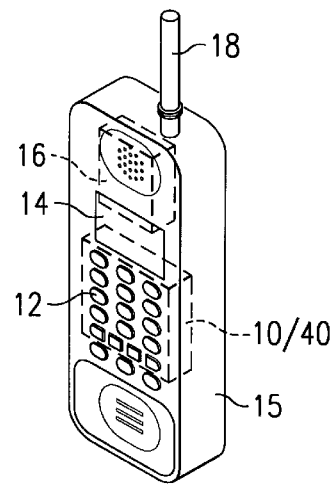
FIG. 25 is a schematic representation of a telecommunications device incorporating the processor of FIG. 1.

FIG. 25 illustrates a exemplary implementation of an example of such an integrated circuit in a mobile telecommunications device, such as a mobile telephone with integrated keyboard 12 and display 14. As shown in FIG. 25, the digital system 10 with processor 100 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

Thus, there has been described a processor that is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit, and a data computation unit for executing the instructions decoded by the instruction buffer unit. Instructions can be executed in a parallel manner, either in response to implicit parallelism or in response to user defined parallelism.

Furthermore, the microprocessor has a means for tracing the instruction address of the first instruction that is operable to store the address of the first instruction only if the first instruction is adjacent to a discontinuity in the sequence of instructions.

The trace FIFO only stores full program addresses that are adjacent to an instruction address stream discontinuity. For sequential addresses, a data entry is stored that indicates the length format of each instruction so that the instruction address sequence can be reconstructed. For repeat instructions, only the first discontinuity is stored. Advantageously, a smaller FIFO can thereby store enough information to reconstruct a much longer sequence of instruction address.

Another embodiment may also trace data addresses.

The present embodiment limits the trace entry sizes to 1 byte per instruction. This allows for provision of some instruction status (instruction size, instruction condition (true or false), etc.). To further minimize size, another embodiment could use, for example, 2 bits to indicate each instruction. In such an embodiment, only the number of instruction executed by the processor would be known, for example, 44 instructions in a row starting at the value contained in LPCOFFSET. The encoding could be, for example:

01B ->DISCONTINUITY: look at discontinuity entry to determine from/to PC

10B ->LINEAR FLOW: −1 instruction from previous

00/11B ->INVALID

Starting at LPCOFFSET, the instruction flow can be reconstructed by examining each 2-bit field and determining whether the instruction prior to LPCOFFSET was linear or a discontinuity. An external test system, such as test system 870, can consult the program listing to determine the length of each instruction. The unused conditions could also be used to convey additional information.

In another embodiment, all of the entries for linear instructions are replaced by a single entry which is the number of linearly executed instructions. For example, in the above example a value of "43" would be entered after the "linear flow" encoding entry. Debug software on the test system could reconstruct program flow by consulting the program listing.

Other embodiments may have other various types of compression of the PC trace, according to aspects of the present invention, to store a compressed representation of a sequence of instructions executed in a linear manner.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system comprising a microprocessor, wherein the microprocessor is operable to execute a sequence of instructions obtained from an instruction bus, wherein the microprocessor comprises:

an instruction buffer unit operable to decode a first instruction of the sequence of instructions;

means for providing an instruction address that identifies the first instruction in the sequence of instructions to be decoded by the instruction buffer unit;

means for tracing the instruction address of the first instruction; wherein the means for tracing is operable to store the address of the first instruction only if the first instruction is adjacent to a discontinuity in the sequence of instructions; and wherein the means for tracing is further operable to store a compressed representation of a portion of the sequence of instructions that are executed in a linear manner.

2. The digital system of claim 1, wherein the compressed representation comprises length format data items indicative of a length of each instruction.

3. The digital system according to claim 1, wherein the means for tracing is further operable to store a first discontinuity event type data item if the first instruction is adjacent to a discontinuity in the sequence of instructions.

4. The digital system according to claim 1, wherein the means for tracing is operable to selectively store an instruction address of the first instruction only once if the first instruction is a repeat instruction in response to a mode signal.

5. The digital system of claim 1, wherein:

the means for tracing is further operable to store a first length format data item indicative of a length of the first instruction, the means for tracing is further operable to store a first discontinuity event type data item if the first instruction is adjacent to a discontinuity in the sequence of instructions, and the means for tracing is operable to selectively store an instruction address of the first instruction only once if the first instruction is a repeat instruction.

6. The digital system according to claim 1 being a cellular telephone, further comprising:

an integrated keyboard (12) connected to the processor via a keyboard adapter;

a display (14), connected to the processor via a display adapter;

radio frequency (RF) circuitry (16) connected to the processor; and an aerial (18) connected to the RF circuitry.

7. A method of operating a digital system comprising a microprocessor, wherein the microprocessor is operable to trace a sequence of instruction addresses, comprising the steps of:

providing an instruction address that identifies a first instruction in a sequence of instructions to be decoded by an instruction buffer unit;

decoding the first instruction of the sequence of instructions in the instruction buffer unit;

tracing the instruction address of the first instruction by storing the address of the first instruction only if the first instruction is adjacent to a discontinuity in the sequence of instruction addresses or by storing a first length format data item indicative of a length of the first instruction if the first instruction is not adjacent to a discontinuity;

repeating the steps of providing, decoding and tracing to form a sequence of discontinuity addresses and to form a sequence of instruction lengths; and reconstructing the sequence of instruction addresses by interpolating between each discontinuity in the sequence of discontinuity addresses using the sequence of instruction lengths.

8. A method of operating a digital system comprising a microprocessor, wherein the microprocessor is operable to trace a sequence of instruction addresses, comprising the steps of:

providing an instruction address that identifies a first instruction in a sequence of instructions to be decoded by an instruction buffer unit;

decoding the first instruction of the sequence of instructions in the instruction buffer unit;

tracing the instruction address of the first instruction by storing the address of the first instruction only if the first instruction is adjacent to a discontinuity in the sequence of instruction addresses;

repeating the steps of providing, decoding and tracing to form a sequence of discontinuity addresses; and wherein the step of tracing further comprises storing a compressed representation of a sequence of instructions executed in a linear manner.

9. The method according to claim 8, wherein the step of tracing further comprises storing a first discontinuity event type data item if the first instruction is adjacent to a discontinuity in the sequence of instructions, whereby the cause of the first discontinuity is indicated.

10. The method according to claim 8, wherein the step of tracing further comprises the step of selectively storing the instruction address of the first instruction only once if the first instruction is a repeat instruction.

11. The method according to claim 8, wherein the step of tracing is selectively limited to a pre-selected address range.

12. A method of operating a digital system comprising a microprocessor, wherein the microprocessor is operable to trace a sequence of instruction addresses, comprising the steps of:

providing an instruction address that identifies a first instruction in a sequence of instructions to be decoded by an instruction buffer unit;

decoding the first instruction of the sequence of instructions in the instruction buffer unit;

tracing the instruction address of the first instruction by storing the address of the first instruction only if the first instruction is adjacent to a discontinuity in the sequence of instruction addresses;

repeating the steps of providing, decoding and tracing to form a sequence of discontinuity addresses; and wherein the step of tracing selectively traces only interrupt code, background code, or a combination thereof.

13. A method of operating a digital system comprising a microprocessor, wherein the microprocessor is operable to trace a sequence of instruction addresses, comprising the steps of:

providing an instruction address that identifies a first instruction in a sequence of instructions to be decoded by an instruction buffer unit;

decoding the first instruction of the sequence of instructions in the instruction buffer unit;

tracing the instruction address of the first instruction by storing the address of the first instruction only if the first instruction is adjacent to a discontinuity in the sequence of instruction addresses;

repeating the steps of providing, decoding and tracing to form a sequence of discontinuity addresses;

wherein the step of tracing further comprises:

storing a first length format data item indicative of a length of the first instruction to form a sequence of instruction lengths;

storing a compressed representation of a sequence of instructions executed in a linear manner;

storing a first discontinuity event type data item if the first instruction is adjacent to a discontinuity in the sequence of instructions, whereby the cause of the first discontinuity is indicated; and storing the instruction address of the first instruction only once if the first instruction is a repeat instruction.

14. The method according to claim 13, wherein the step of reconstructing uses the sequence of instruction lengths to interpolate between a first discontinuity and a second discontinuity in the sequence of discontinuity addresses.

15. The method according to claim 14, wherein the step of tracing selectively traces only interrupt code, background code, or a combination thereof.

16. The method according to claim 15, wherein the step of tracing is selectively limited to a pre-selected address range.

* * * * *